(12) United States Patent
Zhao et al.

(10) Patent No.: US 11,750,831 B2
(45) Date of Patent: *Sep. 5, 2023

(54) METHOD AND APPARATUS FOR VIDEO CODING

(71) Applicant: Tencent America LLC, Palo Alto, CA (US)

(72) Inventors: Xin Zhao, San Diego, CA (US); Xiang Li, Los Gatos, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,157

(22) Filed: Sep. 8, 2021

(65) Prior Publication Data

US 2021/0409749 A1 Dec. 30, 2021

Related U.S. Application Data

(63) Continuation of application No. 16/787,628, filed on Feb. 11, 2020, now Pat. No. 11,190,794.

(Continued)

(51) Int. Cl.
*H04N 19/48* (2014.01)
*H04N 19/176* (2014.01)
(Continued)

(52) U.S. Cl.
CPC ........... *H04N 19/48* (2014.11); *H04N 19/176* (2014.11); *H04N 19/18* (2014.11); *H04N 19/91* (2014.11)

(58) Field of Classification Search
CPC ........ H04N 19/48; H04N 19/18; H04N 19/91; H04N 19/176
See application file for complete search history.

(56) References Cited

U.S. PATENT DOCUMENTS 11,190,794 B2 * 11/2021 Zhao ...................... H04N 19/70
2007/0041653 A1 2/2007 Lafon
(Continued)

FOREIGN PATENT DOCUMENTS

WO WO 2018/128323 A1 7/2018

OTHER PUBLICATIONS

International Search Report and Written Opinion dated May 13, 2020 in application PCT/US 20/17860.
(Continued)

*Primary Examiner* — Tsion B Owens
(74) *Attorney, Agent, or Firm* — ARENTFOX SCHIFF LLP

(57) ABSTRACT

Aspects of the disclosure provide methods and apparatuses for video encoding and/or decoding. In some examples, an apparatus for video decoding includes processing circuitry that can decode coded information of a transform block (TB) from a coded video bitstream. The coded information indicates a region of the TB on which a secondary transform is applied. The region includes a first sub-region having transform coefficients calculated by the secondary transform and a second sub-region that is a zero-out region. In response to a determination that a neighboring transform coefficient is in the second sub-region and a current transform coefficient in the TB is not in the second sub-region, the processing circuitry determines the current transform coefficient according to a default value for the neighboring transform coefficient. The processing circuitry reconstructs a sample in the TB based on the transform coefficient for the sample.

20 Claims, 29 Drawing Sheets

SVT-V, position 0

Related U.S. Application Data

(60) Provisional application No. 62/804,666, filed on Feb. 12, 2019.

(51) Int. Cl.
*H04N 19/91* (2014.01)
*H04N 19/18* (2014.01)

(56) References Cited

U.S. PATENT DOCUMENTS

| | | | |
|---|---|---|---|
| 2012/0008683 A1* | 1/2012 | Karczewicz | H04N 19/46 375/E7.243 |
| 2013/0142248 A1 | 6/2013 | Cook et al. | |
| 2017/0238015 A1* | 8/2017 | Karczewicz | H04N 19/14 375/240.12 |
| 2019/0356915 A1* | 11/2019 | Jang | H04N 19/176 |
| 2020/0280740 A1* | 9/2020 | Tsukuba | H04N 19/426 |

OTHER PUBLICATIONS

European Search Report issued in Application EP 20 75 6363.6 dated Jan. 28, 2021, 12 pages.

Supplementary European Search Report issued in Application No. EP 20 75 6363.6 dated Feb. 16, 2021, 1 page.

Chen et al., Jianle, "Algorithm Description of Joint Exploration Test Model (JEM 7)", Document: JVET-G1001-v1, $7^{th}$ Meeting: Torino, IT, Jul. 13-21, 2017, 48 pages.

Salehifar et al., Mehdi, "CE 6.2.6: Reduced Secondary Transform (RST)", Document: JVET-K0099, $11^{th}$ Meeting: Ljubljana, SI, Jul. 10-18, 2018, 12 pages.

Akula et al., Sri Nitchith, "Description of SDR, HDR and 360 video coding technology proposal considering mobile application scenario by Samsun, Huawei, GoPro, and HiSilicon", Document: JVET-J0024, $10^{th}$ Meeting: San Diego, US, Apr. 10-20, 2018, 119 pages.

Zhao et al., Xin, "CE6: Summary Report on Transforms and Transform Signaling", Document: JVET-N0026-v1, $14^{th}$ Meeting: Geneva, CH, Mar. 19-27, 2019, 15 pages.

Siekmann et al., Mischa, "CE6—related: Simplification of the Reduced Secondary Transform", Document: JVET-N0555, $14^{th}$ Meeting: Geneva, CH, Mar. 19-27, 2019, 5 pages.

Koo et al., Moonmo, "CE6: Reduced Secondary Transform (RST) (CE6-3.1)", Document: JVET-N0193, $14^{th}$ Meeting: Geneva, CH, Mar. 19-27, 2019, 19 pages.

\* cited by examiner

| | Descriptor |
|---|---|
| transform_unit(x0, y0, tbWidth, tbHeight, treeType) { | |
|   if( treeType == SINGLE_TREE \|\| treeType == DUAL_TREE_LUMA ) | |
|     tu_cbf_luma[x0][y0] | ae(v) |
|   if( treeType == SINGLE_TREE \|\| treeType == DUAL_TREE_CHROMA ) { | |
|     tu_cbf_cb[x0][y0] | ae(v) |
|     tu_cbf_cr[x0][y0] | ae(v) |
|   } | |
|   if( ( ( ( CuPredMode[x0][y0] == MODE_INTRA ) && sps_mts_intra_enabled_flag) \|\| <br>     ( ( CuPredMode[x0][y0] == MODE_INTER) && sps_mts_inter_enabled_flag)) <br>     && tu_cbf_luma[x0][y0] && treeType != DUAL_TREE_CHROMA <br>     && ( tbWidth <= 32 ) && ( tbHeight <= 32 ) ) | |
|     cu_mts_flag[x0][y0] | ae(v) |
|   if( tu_cbf_luma[x0][y0] ) | |
|     residual_coding(x0, y0, log2( tbWidth), log2( tbHeight), 0 ) | |
|   if( tu_cbf_cb[x0][y0] ) | |
|     residual_coding(x0, y0, log2( tbWidth/ 2 ), log2( tbHeight/ 2 ), 1 ) | |
|   if( tu_cbf_cr[x0][y0] ) | |
|     residual_coding(x0, y0, log2( tbWidth/ 2 ), log2( tbHeight/ 2 ), 2 ) | |
| } | |

| | |
|---|---|
| if( transform_skip_enabled_flag && ( cIdx != 0 \|\| cu_mts_flag[ x0 ][ y0 ] == 0 ) && ( log2TbWidth <= 2 ) && ( log2TbHeight <= 2 ) ) | |
|   transform_skip_flag[ x0 ][ y0 ][ cIdx ] | ae(v) |
| last_sig_coeff_x_prefix | ae(v) |
| last_sig_coeff_y_prefix | ae(v) |
| if( last_sig_coeff_x_prefix > 3 ) | |
|   last_sig_coeff_x_suffix | ae(v) |
| if( last_sig_coeff_y_prefix > 3 ) | |
|   last_sig_coeff_y_suffix | ae(v) |
| ...... | |
| if( dep_quant_enabled_flag ) { | |
|   QState = startQStateSb | |
|   for( n = numSbCoeff - 1; n >= 0; n- - ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     if( sig_coeff_flag[ xC ][ yC ] ) | |
|       TransCoeffLevel[ x0 ][ y0 ][ cIdx ][ xC ][ yC ] = ( 2 * AbsLevel[ xC ][ yC ] - ( QState > 1 ? 1 : 0 ) ) * ( 1 - 2 * coeff_sign_flag[ n ] ) | |
|     QState = QStateTransTable[ QState ][ par_level_flag[ n ] ] | |

*FIG. 10A*

Continue from FIG. 10A

```
} else {
    sumAbsLevel = 0
    for( n = numSbCoeff- 1; n >= 0; n- - ) {
        xC = ( xS << log2SbSize ) +
            DiagScanOrder[ log2SbSize ][ log2SbSize ][ n ][ 0 ]
        yC = ( yS << log2SbSize ) +
            DiagScanOrder[ log2SbSize ][ log2SbSize ][ n ][ 1 ]
        if( sig_coeff_flag[ xC ][ yC ] ) {
            TransCoeffLevel[ x0 ][ y0 ][ cIdx ][ xC ][ yC ] =
                AbsLevel[ xC ][ yC ] * ( 1- 2 * coeff_sign_flag n ] )
            if( signHidden ) {
                sumAbsLevel += AbsLevel[ xC ][ yC ]
                if( ( n = = firstSigScanPosSb ) && ( sumAbsLevel% 2 ) = = 1 ) )
                    TransCoeffLevel[ x0 ][ y0 ][ cIdx ][ xC ][ yC ] =
                    - TransCoeffLevel[ x0 ][ y0 ][ cIdx ][ xC ][ yC ]
            }
        }
    }
}
if( cu_mts_flag[ x0 ][ y0 ] && ( cIdx = = 0 ) &&
    ! transform_skip_flag[ x0 ][ y0 ][ cIdx ] &&
    ( ( CuPredMode[ x0 ][ y0 ] = = MODE_INTRA && numSigCoeff > 2 ) ||
    ( CuPredMode[ x0 ][ y0 ] = = MODE_INTER ) ) ) {
        mts_idx[ x0 ][ y0 ]                                              ae(v)
}
```

FIG. 10B

| | Descriptor |
|---|---|
| residual_coding(x0, y0, log2TbWidth, log2TbHeight,cIdx ) { | |
|   if( transform_skip_enabled_flag && (cIdx!= 0 \|\| tu_mts_flag[x0][y0] == 0 ) && <br>   ( log2TbWidth <= 2 ) && ( log2TbHeight <= 2 )) | |
|     transform_skip_flag[x0][y0][cIdx] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | |
|   ...... | |
|   for( i = lastSubBlock; i >= 0;i? ) { | |
|   ...... | |
|   if( ( i < lastSubBlock ) && (i>0) ) { | |
|   if( ( ( tu_mts_flag[x0][y0] == 0 \|\| cIdx != 0 ) && ( xS << log2SbSize ) < 32 && <br>   ( yS << log2SbSize ) < 32) \|\|(( tu_mts_flag[x0][y0] == 1 && <br>   (xS << log2SbSize) < 16 && (yS << log2SbSize) < 16)) | |
|     coded_sub_block_flag[xS][yS] | ae(v) |
|     inferSbDcSigCoeffFlag = 1 | |
|   } | |
|   ...... | |
|   if( tu_mts_flag[x0][y0] && ( cIdx == 0 ) ) | |
|     mts_idx[x0][y0][cIdx] | ae(v) |
| } | |

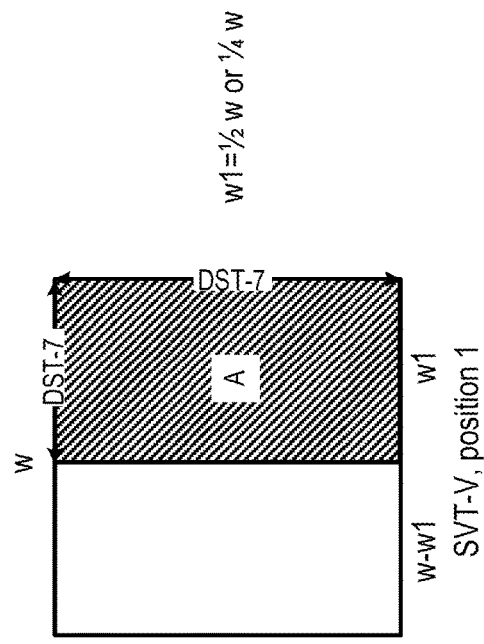
FIG. 14A
FIG. 14B
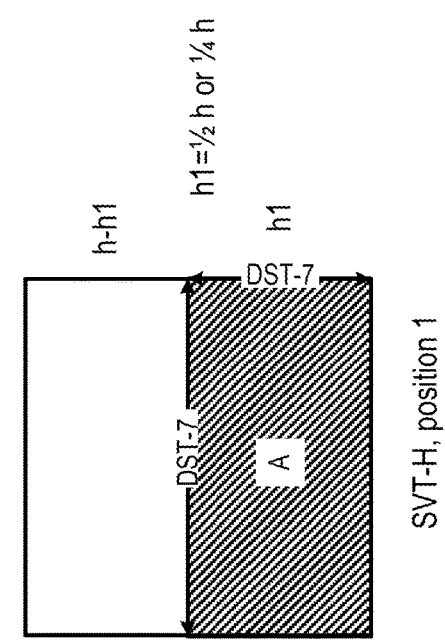
FIG. 14C
FIG. 14D

Sequence parameter set RBSP syntax

| | Descriptor |
|---|---|
| seq_parameter_set_rbsp() { | |
| sps_seq_parameter_set_id | ue(v) |
| ... | |
| sps_mts_intra_enabled_flag | u(1) |
| sps_mts_inter_enabled_flag | u(1) |
| sps_sbt_enable_flag | u(1) — 2101 |
| rbsp_trailing_bits() | |
| } | |

*FIG. 15A*

General slice header syntax

| slice_header( ) { | Descriptor |
|---|---|
|   slice_pic_parameter_set_id | ue(v) |
|   slice_address | u(v) |
|   slice_type | ue(v) |
|   if( slice_type != I ) { | |
|     log2_diff_ctu_max_bt_size | ue(v) |
|     if( sps_sbtmvp_enabled_flag ) { | |
|       sbtmvp_size_override_flag | u(1) |
|       if( sbtmvp_size_override_flag ) | |
|         log2_sbtmvp_active_size_minus2 | u(3) |
|     } | |
|     if( sps_temporal_mvp_enabled_flag ) | |
|       slice_temporal_mvp_enabled_flag | u(1) |
|     if( slice_type == B ) | |
|       mvd_l1_zero_flag | u(1) |
|     if( slice_temporal_mvp_enabled_flag ) { | |
|       if( slice_type == B ) | |
|         collocated_from_l0_flag | u(1) |
|     } | |
|     six_minus_max_num_merge_cand | ue(v) |
|     if( sps_sbt_enable_flag ) | |
|       slice_max_sbt_size_64_flag | u(1) |
|   } | |
|   if ( sps_alf_enabled_flag ) { | |
|     slice_alf_enabled_flag | u(1) |
|     if( slice_alf_enabled_flag ) | |
|       alf_data( ) | |
|   } | |
|   dep_quant_enabled_flag | u(1) |
|   if( !dep_quant_enabled_flag ) | |
|     sign_data_hiding_enabled_flag | u(1) |
|   byte_alignment( ) | |
| } | |

Coding unit syntax

| coding_unit( x0, y0, cbWidth, cbHeight, treeType ) { | Descriptor |
|---|---|
| ... | |
|   if( CuPredMode[ x0 ][ y0 ] != MODE_INTRA && cu_skip_flag[ x0 ][ y0 ] == 0 ) | |
|     cu_cbf | ae(v) |
|   if( cu_cbf ) { | |
|     if( CuPredMode[ x0 ][ y0 ] != MODE_INTRA && sps_sbt_enable_flag ) { | |
|       if( cbWidth <= maxSbtSize && cbHeight <= maxSbtSize ) { | |
|         allowSbtVerHalf = cbWidth >= 8 | |
|         allowSbtVerQuad = cbWidth >= 16 | |
|         allowSbtHorHalf = cbHeight >= 8 | |
|         allowSbtHorQuad = cbHeight >= 16 | |
|         if( allowSbtVerHalf \|\| allowSbtHorHalf \|\|<br>          allowSbtVerQuad \|\| allowSbtHorQuad ) | |
|           cu_sbt_flag[ x0 ][ y0 ] | ae(v) |
|       } | |
|       if( cu_sbt_flag[ x0 ][ y0 ] ) { | |
|         if( ( allowSbtVerHalf \|\| allowSbtHorHalf ) &&<br>          ( allowSbtVerQuad \|\| allowSbtHorQuad ) ) | |
|           cu_sbt_quad_flag[ x0 ][ y0 ] | ae(v) |
|         if( ( cu_sbt_quad_flag[ x0 ][ y0 ] && allowSbtVerQuad && allowSbtHorQuad )<br>          \|\| ( !cu_sbt_quad_flag[ x0 ][ y0 ] && allowSbtVerHalf && allowSbtHorHalf ) ) | |
|           cu_sbt_horizontal_flag[ x0 ][ y0 ] | ae(v) |
|         cu_sbt_pos_flag[ x0 ][ y0 ] | ae(v) |
|       } | |
|     } | |
|     transform_tree( x0, y0, cbWidth, cbHeight, treeType ) | |
|   } | |
| } | |

Transform tree syntax

| transform_tree( x0, y0, tbWidth, tbHeight, treeType ) { | Descriptor |
|---|---|
| if( tbWidth > MaxTbSizeY \|\| tbHeight > MaxTbSizeY ) { | |
|     trafoWidth = ( tbWidth > MaxTbSizeY ) ? ( tbWidth / 2 ) : tbWidth | |
|     trafoHeight = ( tbHeight > MaxTbSizeY ) ? ( tbHeight / 2 ) : tbHeight | |
|     transform_tree( x0, y0, trafoWidth, trafoHeight ) | |
|     if( tbWidth > MaxTbSizeY ) | |
|         transform_tree( x0 + trafoWidth, y0, trafoWidth, trafoHeight, treeType ) | |
|     if( tbHeight > MaxTbSizeY ) | |
|         transform_tree( x0, y0 + trafoHeight, trafoWidth, trafoHeight, treeType ) | |
|     if( tbWidth > MaxTbSizeY && tbHeight > MaxTbSizeY ) | |
|         transform_tree( x0 + trafoWidth, y0 + trafoHeight, trafoWidth, trafoHeight, treeType ) | |
| } else if( cu_sbt_flag[ x0 ][ y0 ] ) | |
|     factorTb0 = cu_sbt_quad_flag[ x0 ][ y0 ] ? 1 : 2 | |
|     factorTb0 = cu_sbt_pos_flag[ x0 ][ y0 ] ? ( 4 - factorTb0 ) : factorTb0 | |
|     noResiTb0 = cu_sbt_pos_flag[ x0 ][ y0 ] ? 1 : 0 | |
|     if( !cu_sbt_horizontal_flag[ x0 ][ y0 ] ) { | |
|         trafoWidth = tbWidth * factorTb0 / 4 | |
|         transform_tree( x0, y0, trafoWidth, tbHeight, treeType , noResiTb0 ) | |
|         transform_tree( x0 + trafoWidth, y0, tbWidth - trafoWidth, tbHeight, treeType , !noResiTb0 ) | |
|     } | |
|     else { | |
|         trafoHeight = tbHeight * factorTb0 / 4 | |
|         transform_tree( x0, y0, tbWidth, trafoHeight, treeType , noResiTb0 ) | |
|         transform_tree( x0, y0 + trafoHeight, tbWidth, tbHeight - trafoHeight, treeType , !noResiTb0 ) | |
|     } | |
| } else { | |
|     transform_unit( x0, y0, tbWidth, tbHeight, treeType, 0 ) | |
| } | |
| } | |

FIG. 15D  2104

| Transform unit syntax | Descriptor |
|---|---|
| transform_unit( x0, y0, tbWidth, tbHeight, treeType , !noResi ){ | |
|   if( ( treeType == SINGLE_TREE \|\| treeType == DUAL_TREE_LUMA )**&& !noResi** ) | |
|     tu_cbf_luma[ x0 ][ y0 ] | ae(v) |
|   if( ( treeType == SINGLE_TREE \|\| treeType == DUAL_TREE_CHROMA )**&& !noResi** ) { | |
|     tu_cbf_cb[ x0 ][ y0 ] | ae(v) |
|     tu_cbf_cr[ x0 ][ y0 ] | ae(v) |
|   } | |
|   if( ( ( ( CuPredMode[ x0 ][ y0 ] == MODE_INTRA ) && sps_mts_intra_enabled_flag ) \|\| <br>     ( ( CuPredMode[ x0 ][ y0 ] == MODE_INTER ) && sps_mts_inter_enabled_flag ) ) <br>     && tu_cbf_luma[ x0 ][ y0 ] && treeType != DUAL_TREE_CHROMA <br>     && ( tbWidth <= 32 ) && ( tbHeight <= 32 ) && !cu_sbt_flag[ x0 ][ y0 ] ) | |
|     cu_mts_flag[ x0 ][ y0 ] | ae(v) |
|   if( tu_cbf_luma[ x0 ][ y0 ] ) | |
|     residual_coding( x0, y0, log2( tbWidth ), log2( tbHeight ), 0 ) | |
|   if( tu_cbf_cb[ x0 ][ y0 ] ) | |
|     residual_coding( x0, y0, log2( tbWidth / 2 ), log2( tbHeight / 2 ), 1 ) | |
|   if( tu_cbf_cr[ x0 ][ y0 ] ) | |
|     residual_coding( x0, y0, log2( tbWidth / 2 ), log2( tbHeight / 2 ), 2 ) | |
| } | |

*FIG. 15E*

Table 3

| | cu_sbt_horizontal_flag [xTbY][yTbY] == 0 | | cu_sbt_horizontal_flag [xTbY][yTbY] == 1 | |
|---|---|---|---|---|
| | cu_sbt_pos_flag [xTbY][yTbY] == 0 | cu_sbt_pos_flag [xTbY][yTbY] == 1 | cu_sbt_pos_flag [xTbY][yTbY] == 0 | cu_sbt_pos_flag [xTbY][yTbY] == 1 |
| trTypeHor | 2 | 1 | nTbW > 32 ? 0 : 1 | nTbW > 32 ? 0 : 1 |
| trTypeVer | nTbH > 32 ? 0 : 1 | nTbH > 32 ? 0 : 1 | 2 | 1 |

Table 4

| nfs_idx[xTbY][yTbY] | CuPredMode[xTbY][yTbY] == MODE_INTRA | | CuPredMode[xTbY][yTbY] == MODE_INTER | |
|---|---|---|---|---|
| | trTypeHor | trTypeVer | trTypeHor | trTypeVer |
| −1 (inferred) | 0 | 0 | 0 | 0 |
| 0 (00) | 1 | 1 | 2 | 2 |
| 1 (01) | 2 | 1 | 1 | 2 |
| 2 (10) | 1 | 2 | 2 | 1 |
| 3 (11) | 2 | 2 | 1 | 1 |

FIG. 15F

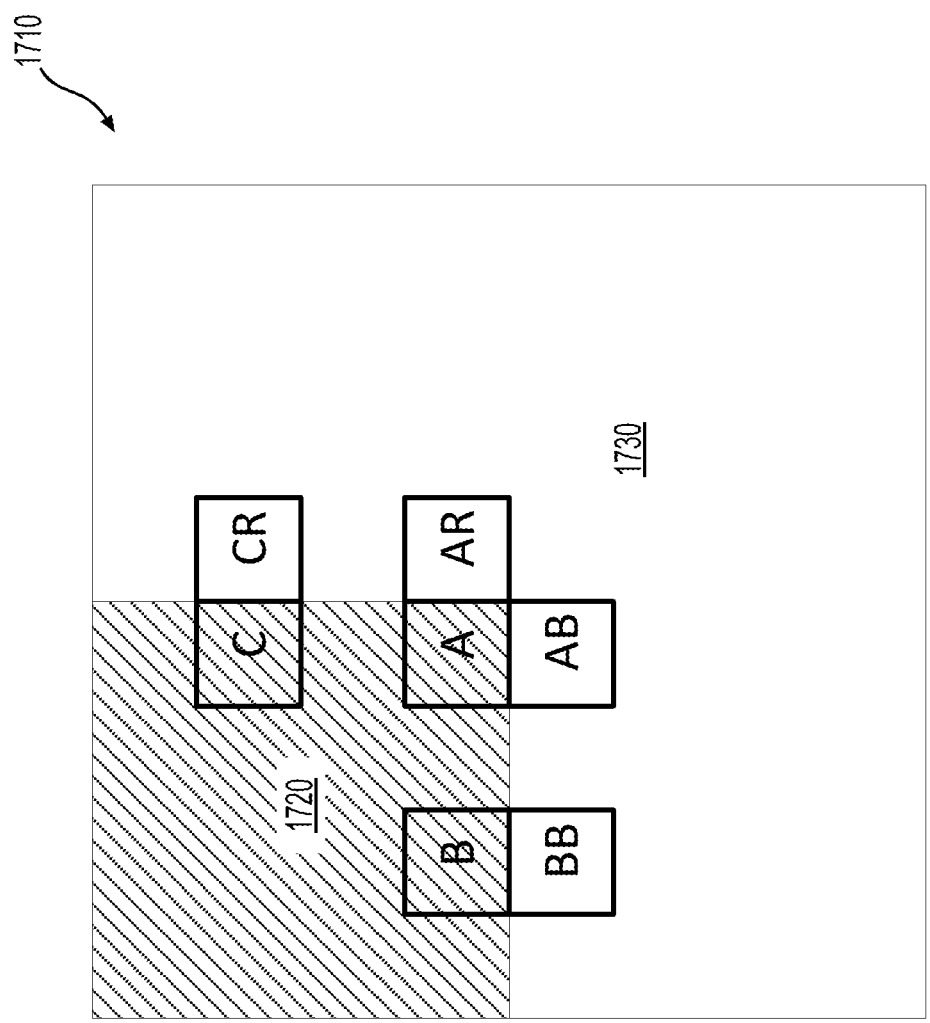

METHOD AND APPARATUS FOR VIDEO CODING

CROSS REFERENCE TO RELATED APPLICATIONS

The present application is a continuation of U.S. application Ser. No. 16/787,628, filed on Feb. 11, 2020, which claims the benefit of priority to U.S. Provisional Application No. 62/804,666, "Transform Coefficient Zero-Out" filed on Feb. 12, 2019, the contents of which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can decode coded information of a transform block (TB) from a coded video bitstream. The coded information can indicate a region of the TB on which a secondary transform is applied. The region can include a first sub-region having transform coefficients calculated by the secondary transform and a second sub-region. The processing circuitry can determine, for a transform coefficient in the TB, whether a neighboring transform coefficient used to determine the transform coefficient is located in the second sub-region. When the neighboring transform coefficient is determined to be located in the second sub-region, the processing circuitry can determine the transform coefficient according to a default value for the neighboring transform coefficient. The processing circuitry can reconstruct a sample in the TB based on the transform coefficient for the sample.

In an embodiment, the transform coefficient in the TB is one of a plurality of transform coefficients in a first coefficient group (CG). A first CG flag for the first CG can indicate whether at least one of the transform coefficients is a non-zero transform coefficient. A second CG including transform coefficients is previously entropy decoded and is a neighbor of the first CG. The processing circuitry can determine a location of the second CG. When the second CG is determined to be located in the second sub-region, the processing circuitry can determine the first CG flag based on a default value for a second CG flag for the second CG.

In an embodiment, the transform coefficient in the TB is one of a plurality of transform coefficients in a first CG. A first CG flag for the first CG can indicate whether at least one of the transform coefficients is a non-zero transform coefficient. A second CG includes a first transform coefficient and a second transform coefficient. The second CG is previously entropy decoded and a neighbor of the first CG. The processing circuitry can determine a location of the second CG. When a portion of the second CG including the second transform coefficient is located in the second sub-region and the first transform coefficient is a non-zero transform coefficient, the processing circuitry can determine the first CG flag based on a second CG flag for the second CG.

In an embodiment, the processing circuitry can determine whether the transform coefficient is located in the second sub-region. When the transform coefficient is determined to be located in the second sub-region, the processing circuitry can determine that the transform coefficient is not signaled and is zero. When the transform coefficient is determined not to be located in the second sub-region, the processing circuitry can perform the determination of whether the neighboring transform coefficient is located in the second sub-region.

In an embodiment, the processing circuitry can determine a syntax element of the transform coefficient. The syntax element can indicate one of: whether the transform coefficient is a non-zero transform coefficient; a parity of the transform coefficient; whether the transform coefficient is larger than 2; and whether the transform coefficient is larger than 4.

Aspects of the disclosure provide a method and an apparatus for video decoding. In some examples, the apparatus for video decoding includes processing circuitry. The processing circuitry can decode coded information of a transform block (TB) from a coded video bitstream. The processing circuitry can determine, based on the coding information, whether a secondary transform is performed on a first region of the TB. The first region can include a first sub-region having transform coefficients calculated by the secondary transform and a second sub-region. When the second transform is determined to be performed, the processing circuitry can determine that transform coefficients in a second region in the TB are zero where the second region being outside the first region.

In an example, a size and a location of a coefficient unit that includes multiple transform coefficients in the TB are determined based on the first region, and transform coefficients outside the coefficient unit are zero.

In an example, the first region is a top-left 8×8 region in the TB, the coefficient unit is the first region, and the second region is adjacent to the top-left 8×8 region.

In an example, the first sub-region is a top-left 4×4 region in the TB, the coefficient unit is the first sub-region in the first region, and transform coefficients in a combined region including the second region and the second sub-region are zero.

In an example, the first region is a top-left 4×4 region in the TB, the coefficient unit is the first region, and the second region is adjacent to the top-left 4×4 region.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 9 shows an example of a transform unit syntax.

FIGS. 10A-10B show an example of residual coding syntax.

FIG. 13 shows an example of a residual coding syntax.

FIGS. 14A-14D show examples of sub-block transforms (SBTs).

FIGS. 15A-15F show changes to a specification text of a video coding standard when SBT is used.

FIG. 17 shows an exemplary coefficient block (1710).

DETAILED DESCRIPTION OF EMBODIMENTS

Figure 1A:
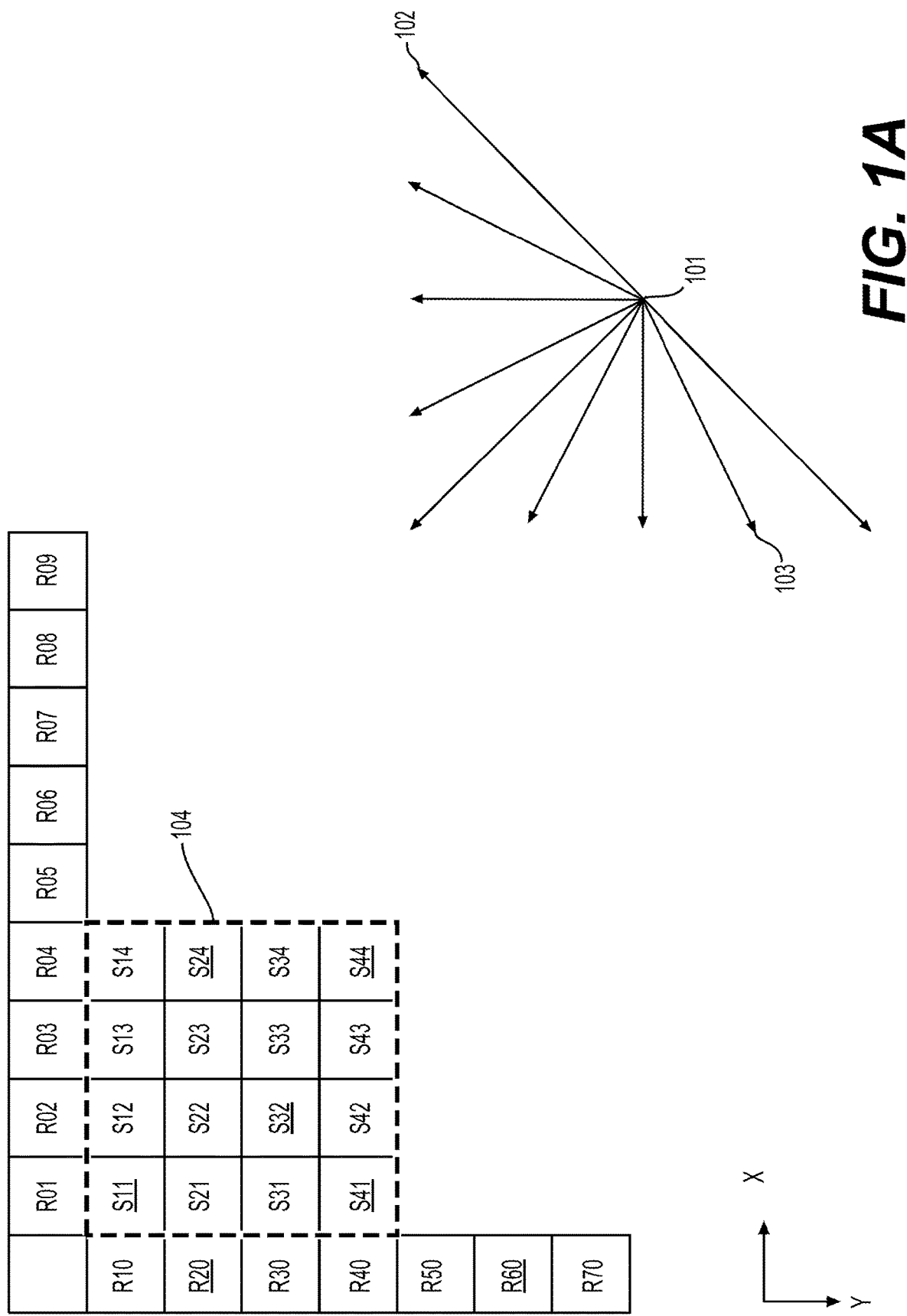
FIG. 1A is a schematic illustration of an exemplary subset of intra prediction modes.
Figure 1B:
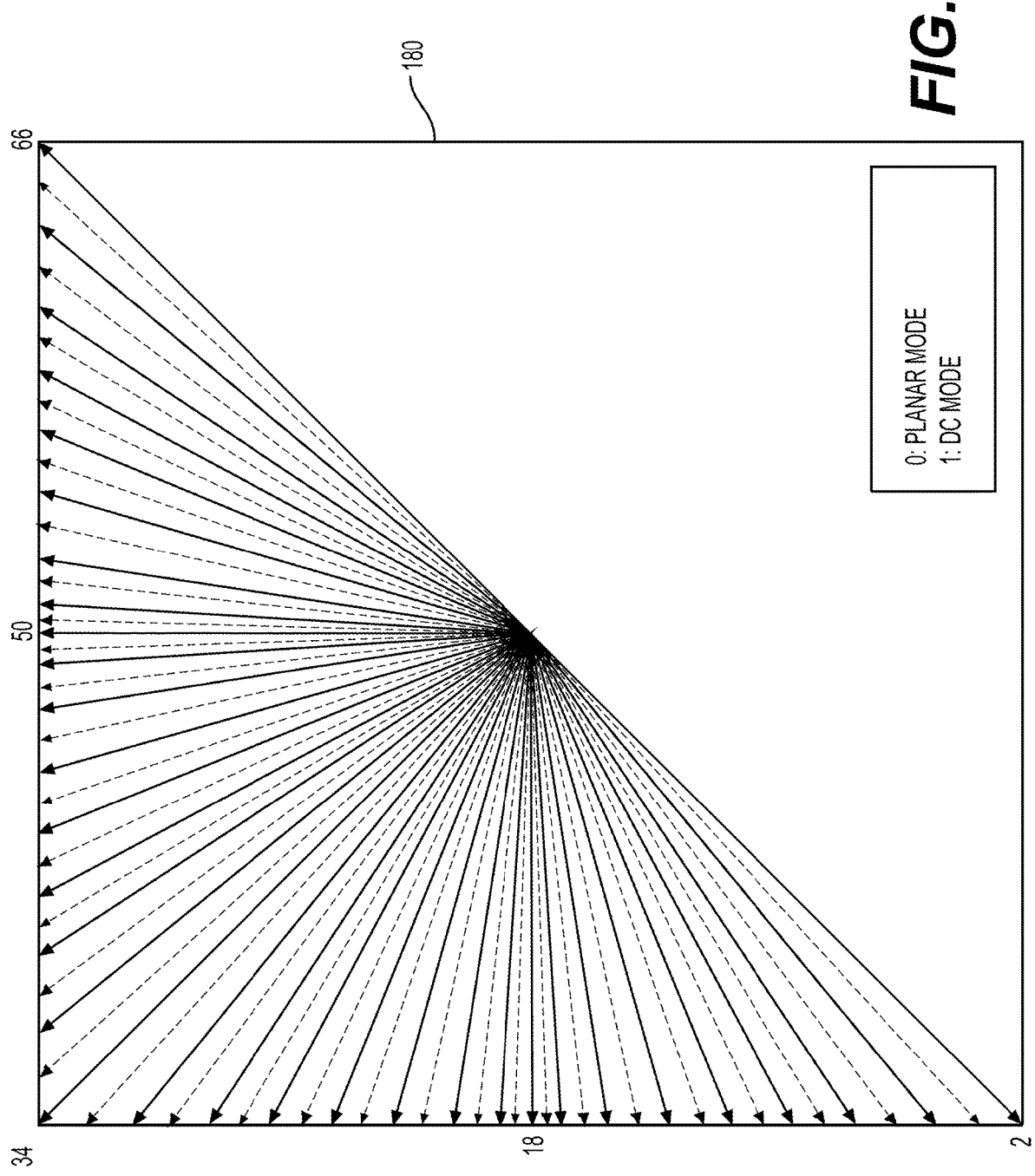
FIG. 1B is an illustration of exemplary intra prediction directions.
Figure 2:
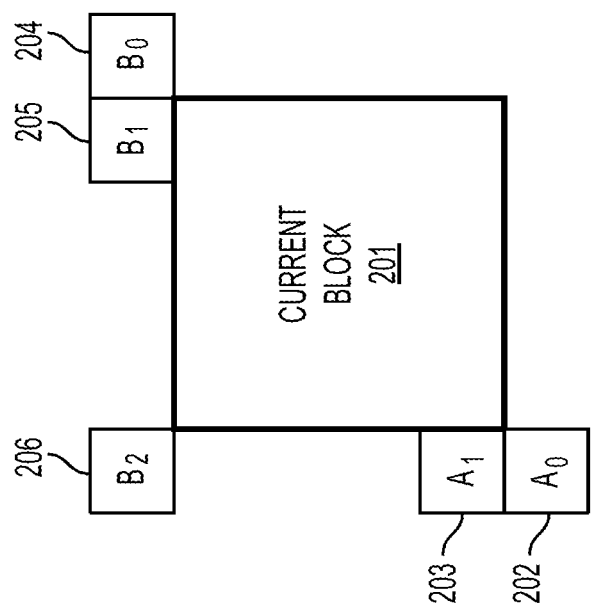
FIG. 2 is a schematic illustration of a current block and its surrounding spatial merge candidates in one example.
Figure 3:
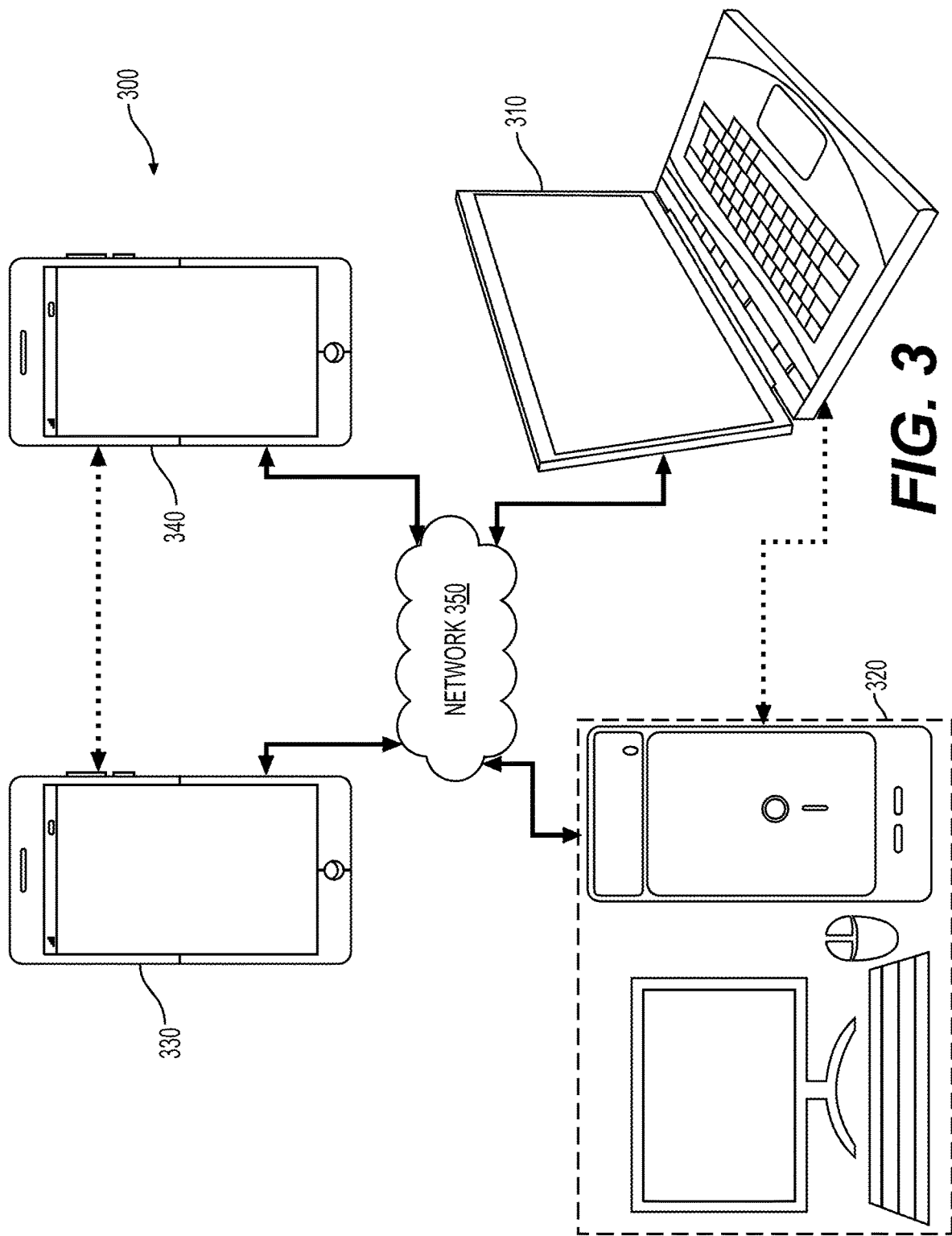
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310)

may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
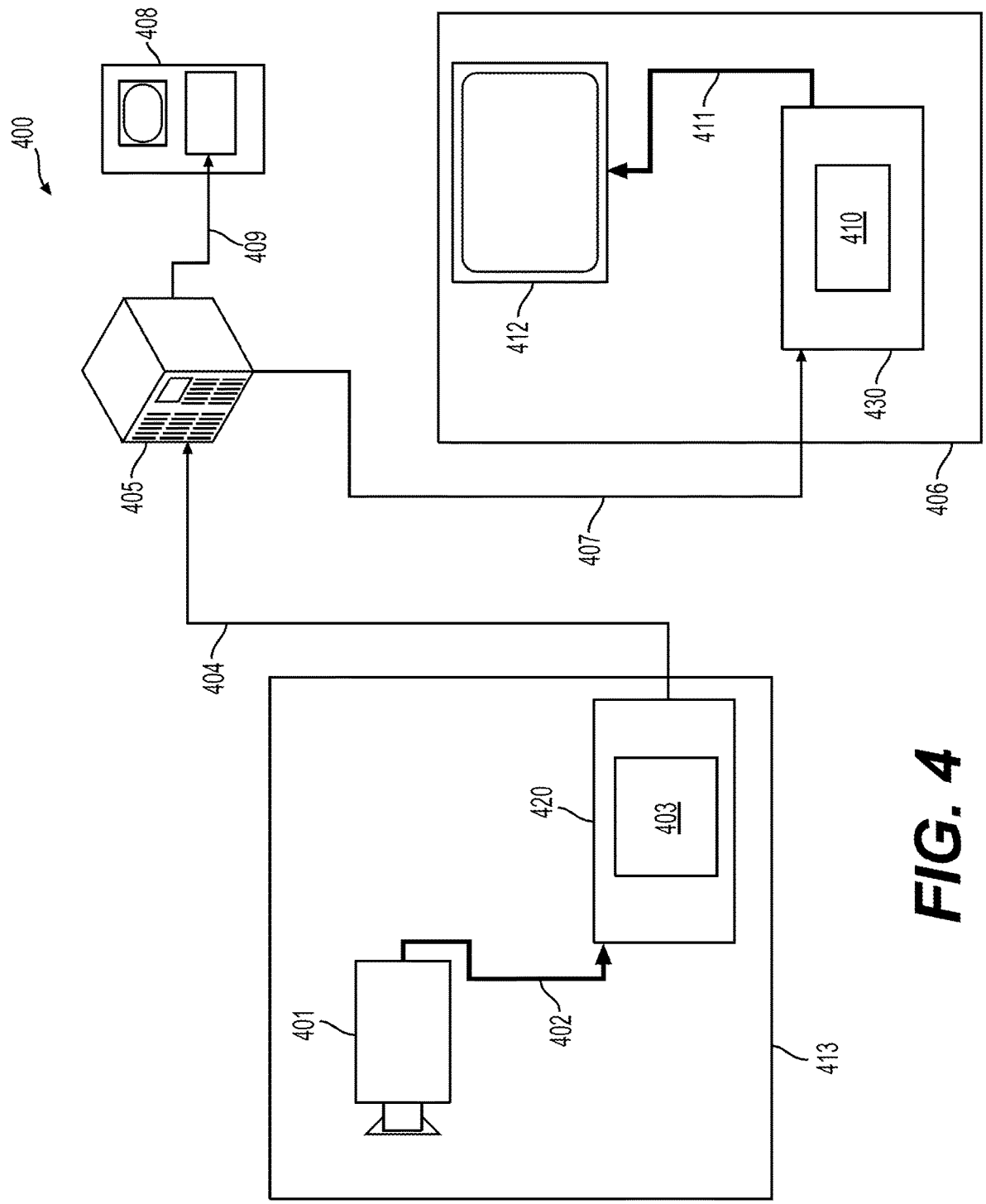
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
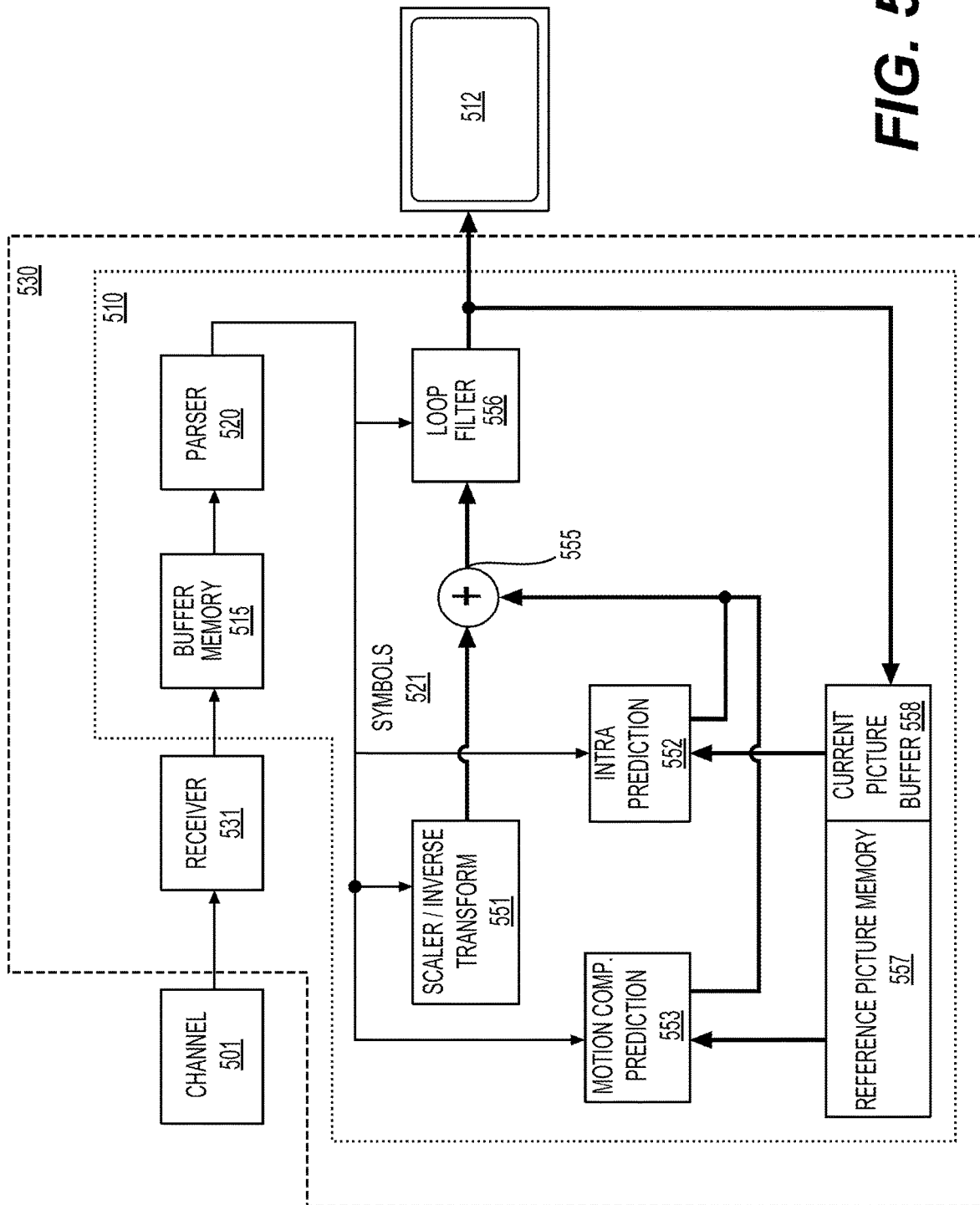
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
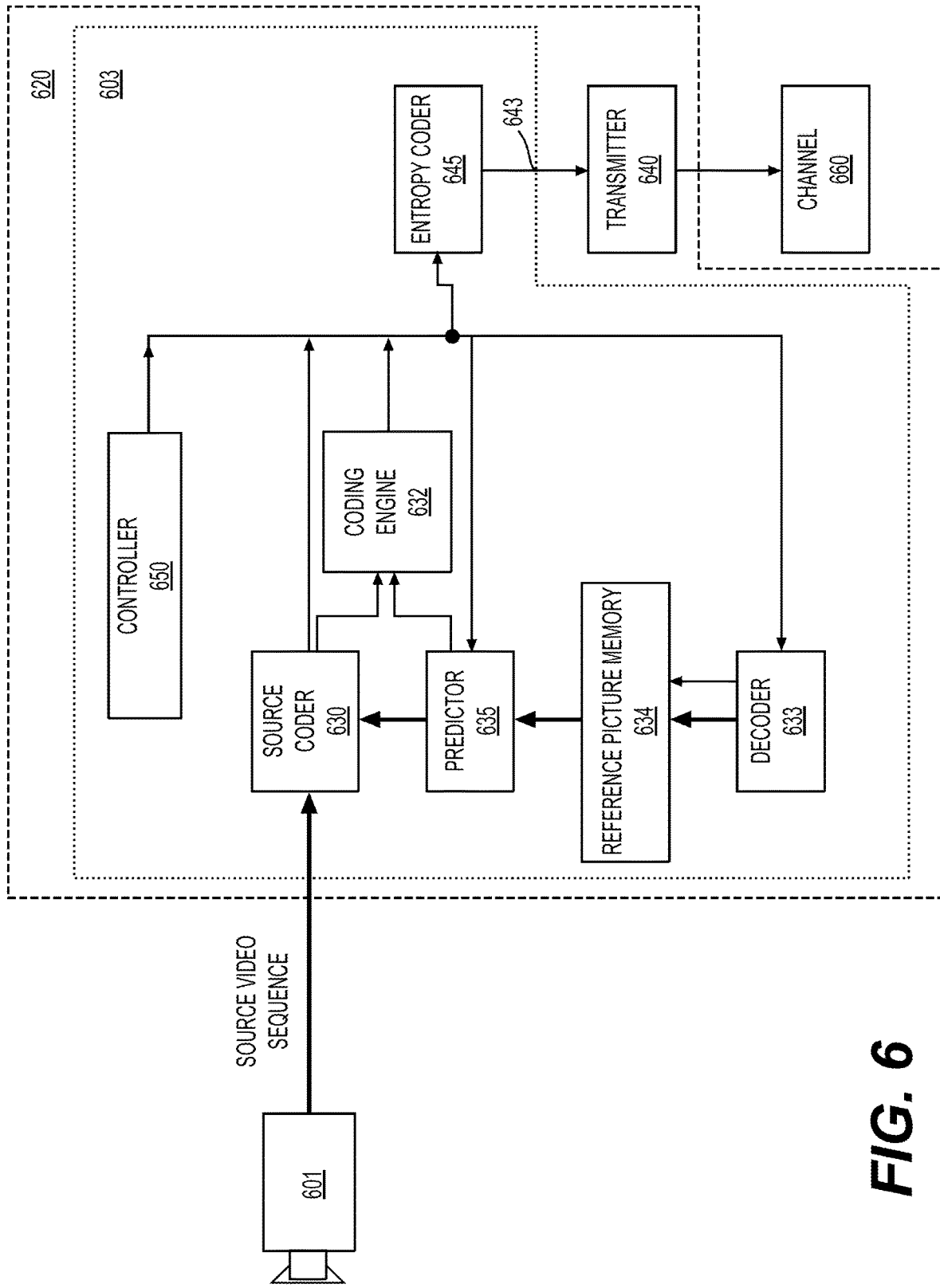
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
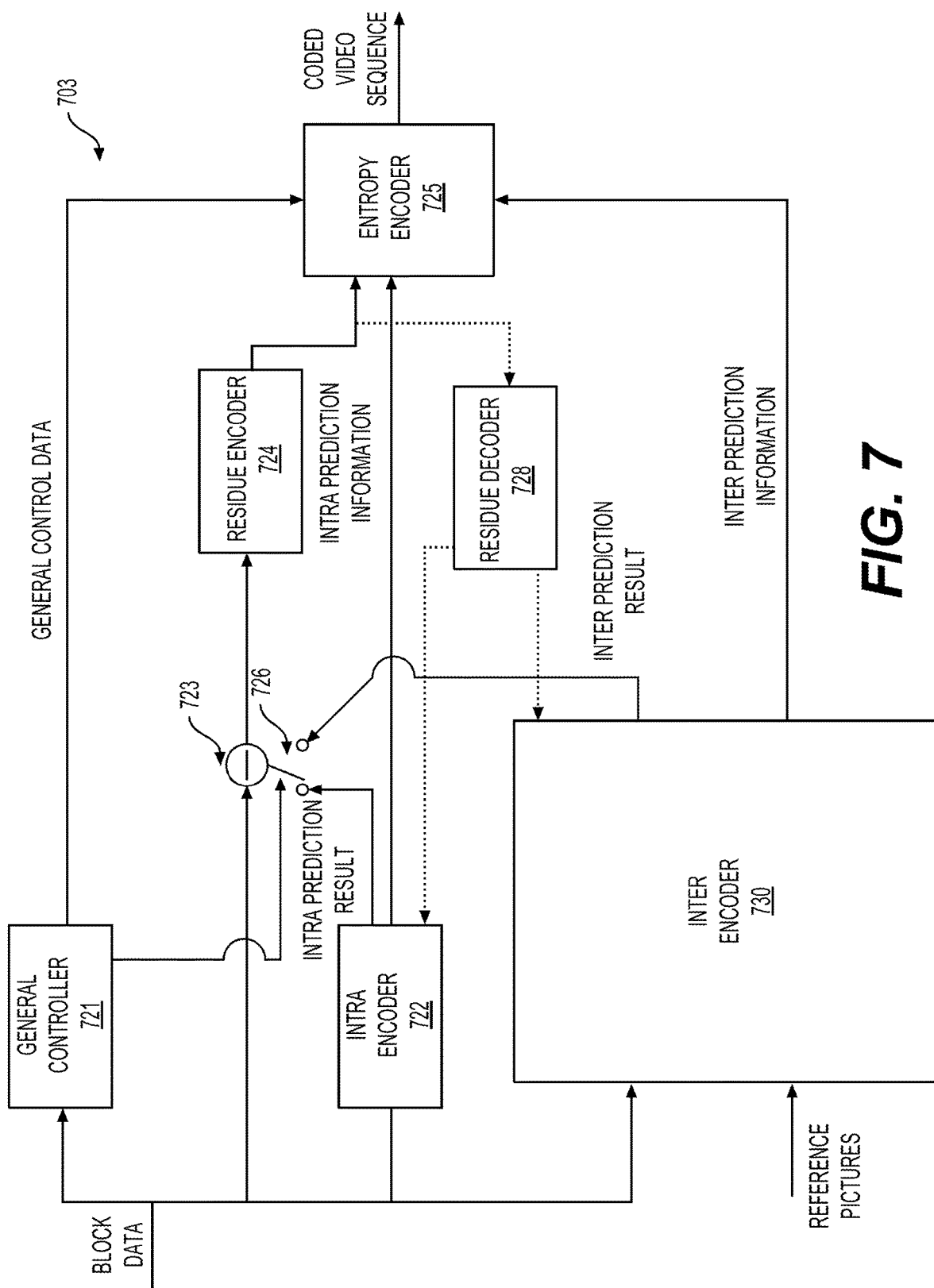
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
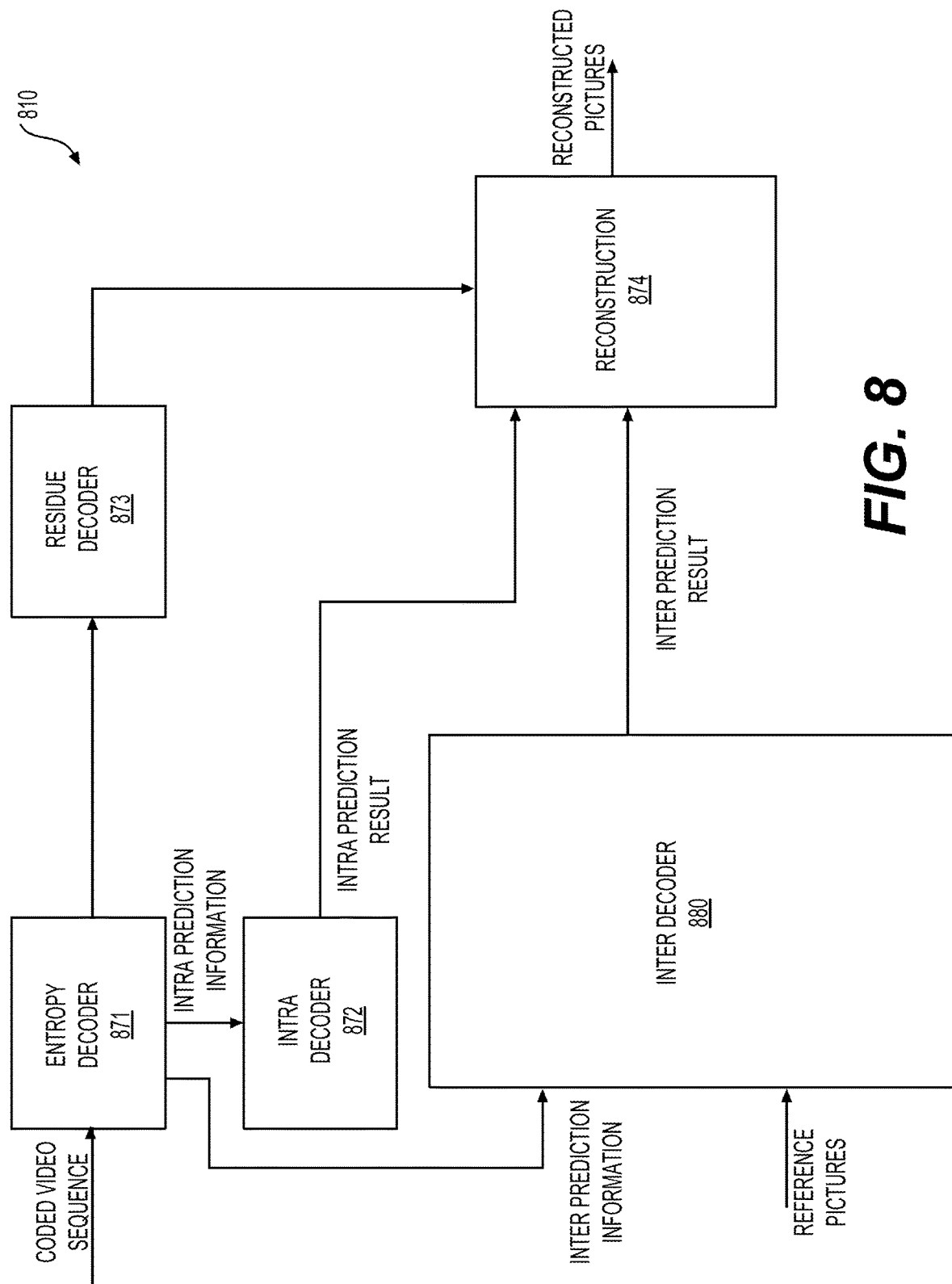
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

In some embodiments, such as in HEVC, a primary transform may include 4-point, 8-point, 16-point and 32-point discrete cosine transform (DCT) type 2 (DCT-2), and the transform core matrices may be represented using 8-bit integers (i.e., 8-bit transform core). The transform core matrices of a smaller DCT-2 are part of transform core matrices of a larger DCT-2, as shown in APPENDIX I.

The DCT-2 core matrices show symmetry/anti-symmetry characteristics. Therefore, a "partial butterfly" implementation may be supported to reduce a number of operation counts (e.g., multiplications, additions, subtractions, shifts, and/or the like), and identical results of matrix multiplication can be obtained using the partial butterfly.

In some embodiments, such as in VVC, besides the 4-point, 8-point, 16-point, and 32-point DCT-2 transforms described above, additional 2-point and 64-point DCT-2 may also be included. An example of a 64-point DCT-2 core, such as used in VVC, is shown in APPENDIX II as a 64×64 matrix.

In addition to DCT-2 and 4×4 DST-7, such as used in HEVC, an Adaptive Multiple Transform (AMT) (also known as Enhanced Multiple Transform (EMT) or Multiple Transform Selection (MTS)) scheme, can be used, such as in VVC, for residual coding for both inter and intra coded blocks. The AMT scheme may use multiple selected transforms from the DCT/DST families other than the current transforms in HEVC. The newly introduced transform matrices are DST-7, DCT-8. Table 1 shows examples of the basis functions of the selected DST/DCT for an N-point input.

TABLE 1

| Transform Type | Basis function $T_i(j)$, $i, j = 0, 1, \ldots, N - 1$ |
|---|---|
| DCT-2 | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-8 | $T_i(j) = \sqrt{\frac{4}{2N+1}} \cdot \cos\left(\frac{\pi \cdot (2i+1) \cdot (2j+1)}{4N+2}\right)$ |
| DST-7 | $T_i(j) = \sqrt{\frac{4}{2N+1}} \cdot \sin\left(\frac{\pi \cdot (2i+1) \cdot (j+1)}{2N+1}\right)$ |

The primary transform matrices, such as used in VVC, may be used with 8-bit representation. The AMT applies transform matrices to the transform blocks with both a width and a height smaller than or equal to 32. Whether AMT is applied may be controlled by a flag (e.g., an mts_flag). When the mts_flag is equal to 0, in some examples, only DCT-2 is applied for coding residue data. When the mts_flag is equal to 1, an index (e.g., an mts_idx) may be further signalled using 2 bins to identify the horizontal and vertical transform to be used according to Table 2 for example, where a type value of 1 means DST-7 is used, and a type value of 2 means DCT-8 is used. In Table 2, the specification of trTypeHor and trTypeVer depends on mts_idx[x][y][cIdx].

TABLE 2

| mts_idx[xTbY][yTbY][cIdx] | trTypeHor | trTypeVer |
|---|---|---|
| −1 | 0 | 0 |
| 0 | 1 | 1 |
| 1 | 2 | 1 |
| 2 | 1 | 2 |
| 3 | 2 | 2 |

In some embodiments, an implicit MTS can be applied when the above signaling based MTS (i.e., explicit MTS) is not used. With the implicit MTS, the transform selection is made according to the block width and height instead of the signaling. For example, with an implicit MTS, DST-7 is selected for a shorter side (i.e., a minimum one of M and N) of the block of M×N and DCT-2 is selected for a longer side (i.e., a maximum one of M and N) of the block.

Exemplary transform cores, each of which is a matrix composed by the basis vectors of DST-7 and DCT-8 are illustrated in APPENDIX III.

In some examples, such as in VVC, when both the height and width of the coding block is smaller than or equal to 64, the TB size is the same as the coding block size. When either the height or width of the coding block is larger than 64, when doing a transform (such as an inverse transform, an inverse primary transform, or the like) or intra prediction, the coding block is further split into multiple sub-blocks, where the width and height of each sub-block is smaller than or equal to 64. One transform can be performed on each sub-block.

Related syntax and semantics of MTS in some examples in VVC can be described below in FIG. 9 and FIGS. 10A-10B (e.g., related syntax is highlighted using frames 901 and 1001. FIG. 9 shows an example of a transform unit syntax. FIGS. 10A-10B show an example of residual coding syntax. An example of transform unit semantics is as follows. cu_mts_flag[x0][y0] equal to 1 specifies that multiple transform selection is applied to the residual samples of the associated luma transform block. cu_mts_flag[x0][y0] equal to 0 specifies that multiple transform selection is not applied to the residual samples of the associated luma transform block. The array indices x0, y0 specify the location (x0, y0) of the top-left luma sample of the considered transform block relative to the top-left luma sample of the picture. When cu_mts_flag[x0][y0] is not present, it is inferred to be equal to 0.

An example of residual coding semantics is as follows. mts_idx[x0][y0] specifies which transform kernels are applied to the luma residual samples along the horizontal and vertical direction of the current transform block. The array indices x0, y0 specify the location (x0, y0) of the top-left luma sample of the considered transform block relative to the top-left luma sample of the picture. When mts_idx[x0][y0] is not present, it is inferred to be equal to −1.

In some embodiments, a coding block can be split into sub-blocks having, for example, a size of 4×4. The sub-blocks inside a coding block and transform coefficients within each sub-block can be coded according to predefined scan orders. For a sub-block with at least one non-zero transform coefficient, the coding of transform coefficients can be separated into multiple scan passes, such as 4 scan passes. During each pass, transform coefficients (also referred to as coefficients) in the respective sub-block can be scanned, for example, in an inverse diagonal scan order.

Figure 11:
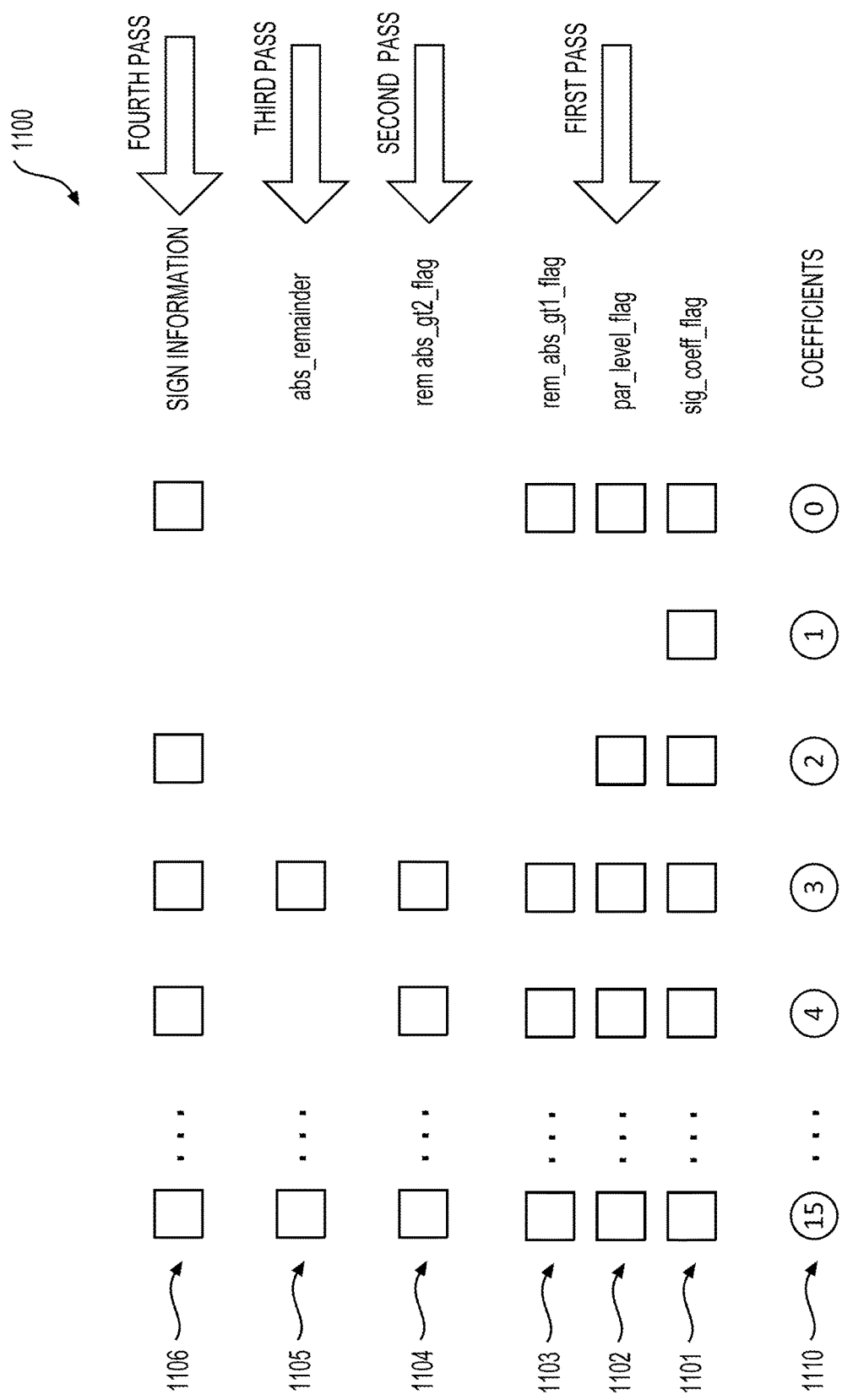
FIG. 11 shows an example of a sub-block scanning process (1100).

FIG. 11 shows an example of a sub-block scanning process (1100) from which different types of syntax elements of transform coefficients can be generated. The sub-block can be a 4×4 sub-block having sixteen coefficients (1110). The 16 coefficients (1110) can be scanned based on a scan order, such as from 0 to 15, as shown in FIG. 11. During a first pass, the coefficients (1110) are scanned over, and three types of syntax elements (1101)-(1103) can possibly be generated for each of the coefficients (1110):

(i) A first type of syntax elements (1101) can be an significance flag (e.g., an sig_coeff_flag) that indicates whether an absolute transform coefficient level or value of the respective transform coefficient (e.g., absLevel) is larger than zero. The first type of syntax elements can be a binary syntax element.

(ii) A second type of syntax elements (1102) can be a parity flag (e.g., an par_level_flag) that indicates a parity of the absolute transform coefficient level of the respective transform coefficient. In an example, the parity flag is generated only when the absolute transform coefficient level of the respective transform coefficient is non-zero. The second type of syntax elements can be a binary syntax element.

(iii) A third type of syntax elements (1103) can be a greater 1 flag (e.g., an rem_abs_gt1_flag) that indicates whether (absLevel−1)>>1 is greater than 0 for the respective transform coefficient. In an example, the greater 1 flag is generated only when the absolute transform coefficient level of the respective transform coefficient is non-zero. The third type of syntax elements can be a binary syntax element.

During a second pass, a fourth type of syntax elements (1104) can possibly be generated. The fourth type of syntax elements (1104) can be a greater 2 flag (e.g., a rem_abs_gt2_flag). The fourth type of syntax elements (1104) indicates whether the absolute transform coefficient level of the respective transform coefficient is greater than 4. In an example, the greater 2 flags are generated only when (absLevel−1)>>1 is greater than 0 for the respective transform coefficient. The fourth type of syntax elements can be a binary syntax element.

During a third pass, a fifth type of syntax elements (1105) can possibly be generated. The fifth type of syntax elements (1105) is denoted by abs_remainder, and indicates a remaining value of the absolute transform coefficient level of the respective transform coefficient that is greater than 4. In an example, the fifth type of syntax elements (1105) are generated only when the absolute transform coefficient level of the respective transform coefficient is greater than 4. The fifth type of syntax elements can be a non-binary syntax element.

During a fourth pass, a sixth type of syntax elements (1106) can be generated for the coefficients (1110) with a non-zero coefficient level indicating a sign of the respective transform coefficient (1110).

The above described various types of syntax elements (1101-1106) can be provided to an entropy encoder according to the order of the passes and the scan order in each pass. Different entropy encoding schemes can be employed for encoding different types of syntax elements. For example, in an embodiment, significance flags, parity flags, greater 1 flags, and greater 2 flags can be encoded with a CABAC based entropy encoder. In contrast, the syntax elements generated during the third and fourth passes can be encoded with a CABAC-bypassed entropy encoder (e.g., a binary arithmetic encoder with fixed probability estimates for input bins).

Context modeling can be performed to determine context models for bins of some types of transform coefficient syntax elements. In an embodiment, the context models can be determined according to a local template and a diagonal position of a current coefficient possibly in combination with other factors.

Figure 12:
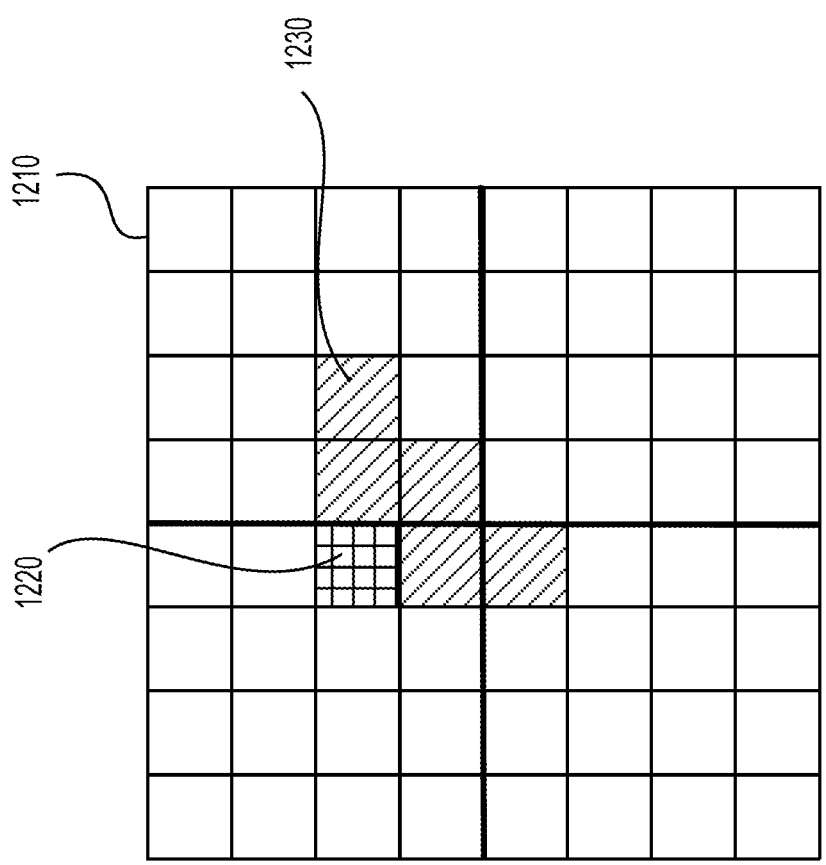
FIG. 12 shows an example of a local template (1230) used for context selection for a current coefficient (1220).

FIG. 12 shows an example of a local template (1230) used for context selection for a current coefficient (1220). To exploit the correlation between transform coefficients, previously coded coefficients covered by the local template (1230) can be used in the context selection for the current coefficient (1220). The local template (1230) can cover a set of neighboring positions or coefficients of the current coefficient (1220) in a coefficient block (1210). The coefficient block (1210) can have a size of 8×8 coefficients. The coefficient block (1210) is partitioned into 4 sub-blocks each with a size of 4×4 coefficients. In the FIG. 12 example, the local template (1230) is defined to be a 5 position template covering 5 coefficient levels at a bottom-right side of the current coefficient (1220). When an inverse diagonal scan order is used for multiple passes over the coefficients within the coefficient block (1210), the neighboring coefficients within the local template (1230) are processed prior to the current coefficient (1220).

During a context modeling, information of the coefficient levels within the local template (1230) can be used to determine a context model. For this purpose, a measure, referred to as a template magnitude, is defined in some embodiments to measure or indicate magnitudes of the transform coefficients or transform coefficient levels within the local template (1230). The template magnitude can then be used as the basis for selecting the context model.

In one example, the template magnitude is defined to be a sum (e.g., sumAbs1) of partially reconstructed absolute transform coefficient levels inside the local template (1230). A partially reconstructed absolute transform coefficient level absLevel1[x][y] can be determined according to bins of the syntax elements, sig_coeff_flag, par_level_flag, and rem_abs_gt1_flag of the respective transform coefficient. The three types of syntax elements are obtained after a first pass over transform coefficients of a sub-block performed in an entropy encoder or an entropy decoder. In an embodiment, a partially reconstructed absolute transform coefficient level absLevel1[x][y] at a position (x, y) after the first pass can be determined according to:

$$absLevel1[x][y]=sig\_coeff\_flag[x][y]+par\_level\_flag[x][y]2*rem\_abs\_gt1\_flag[x][y],$$

where x and y are coordinates with respect to a top-left corner of the coefficient block (1210), absLevel1[x][y] represents the partially reconstructed absolute transform coefficient level at the position (x, y).

d represents a diagonal position of the current coefficient where d is a sum of x and y and numSig represents a number of non-zero coefficients in the local template (1230). For example, sumAbs1 represents a sum of partially reconstructed absolute level absLevel1[x][y] for coefficients covered by the local template (1230).

When coding a sig_coeff_flag of the current coefficient (1220), the context model index is selected depending on sumAbs1 and a diagonal position d of the current coefficient (1220). d is a sum of x and y. sumAbs1 represents a sum of partially reconstructed absolute level absLevel1[x][y] for coefficients covered by the local template (1230). In an embodiment, for a Luma component, the context model index is determined according to:

$$ctxSig=18*\max(0,state-1)+\min(sumAbs1,5)+(d<2?12:(d<5?6:0)) \quad \text{Eq. 1}$$

where ctxSig represents the context index of the significance flag syntax element, and "state" specifies a state of a scaler quantizer of a dependent quantization scheme. In an example, the "state" is derived using a state transition process. Eq. (1) is equivalent to the follows:

$$ctxIdBase=18*\max(0,state-1)+(d<2?12:(d<5?6:0)) \quad \text{Eq. 2}$$

$$ctxSig=ctxIdSigTable[\min(sumAbs1,5)]+ctxIdBase \quad \text{Eq. 3}$$

where ctxIdBase represents a context index base. The context index base can be determined based on the state and the diagonal position d. For example, the state can have a value of 0, 1, 2, or 3, and accordingly max(0, state−1) can have one of three possible values, 0, 1, or 2. For example, (d<2?12: (d<5?6:0)) can take a value of 12, 6, or 0, corresponding to different range of d: d<2, 2<=d<5, or 5<=d. ctxIdSigTable [ ] can represent an array data structure, and stores context index offsets of significance flags with respect to the ctxIdBase. For example, for different sumAbs1 values, min (sumAbs1, 5) clips a sumAbs1 value to be smaller than or equal to 5. Then, the clipped value is mapped to a context index offset. For example, under the definition of ctxIdSigTable[0~5]={0, 1, 2, 3, 4, 5}, the clipped value 0, 1, 2, 3, 4, or 5 are mapped to 0, 1, 2, 3, 4, or 5, respectively.

In an embodiment, for a Chroma component, the context index can be determined according to:

$$ctxSig=12*\max(0,state-1)+\min(sumAbs1,5)+(d<2?6:0), \quad \text{Eq. 4}$$

Eq. 4 is equivalent to Eqs. 5 and 6 below.

$$ctxIdBase=12*\max(0,state-1)+(d<2?6:0), \quad \text{Eq. 5}$$

$$ctxSig=ctxIdSigTable[\min(sumAbs1,5)]+ctxIdBase. \quad \text{Eq. 6}$$

where state specifies the scalar quantizer used if the dependent quantization is enabled and state is derived using a state transition process. The table ctxIdSigTable stores the context model index offset, ctxIdSigTable[0~5]={0, 1, 2, 3, 4, 5}.

When coding par_level_flag of the current coefficient (1220), the context index can be selected depending on sumAbs1, numSig and the diagonal position d. numSig represents a number of non-zero coefficients in the local template (1230). For example, for luma component, the context index can be determined according to:

$$ctxPar=1+\min(sumAbs1-numSig,4)+(d==0?15:(d<3?10:(d<10?5:0))) \quad \text{Eq. 7}$$

Eq. 7 is equivalent to the follows:

$$ctxIdBase=(d==0?15:(d<3?10:(d<10?5:0))), \quad \text{Eq. 8}$$

$$ctxPar=1+ctxIdTable[\min(sumAbs1-numSig,4)]+ctxIdBase, \quad \text{Eq. 9}$$

where ctxPar represents the context index of the parity flag, and ctxIdTable[ ] represents an array data structure, and stores context index offsets with respect to the respective ctxIdBase. For example, ctxIdTable[0~4]={0, 1, 2, 3, 4}.

For Chroma, the context index can be determined according to:

$$ctxPar=1+\min(sumAbs1-numSig,4)+(d==0?5:0), \quad \text{Eq. 10}$$

Eq. 10 is equivalent to the follows:

$$ctxIdBase=(d==0?5:0), \quad \text{Eq. 11}$$

$$ctxPar=1+ctxIdTable[\min(sumAbs1-numSig,4)]+ctxIdBase. \quad \text{Eq. 12}$$

where the table ctxIdTable stores the context model index offset and in an example, ctxIdTable[0~4]={0, 1, 2, 3, 4}.

When coding rem_abs_gt1_flag and rem_abs_gt2_flag of the current coefficient (1120), the context model indices can be determined in the same way as par_level_flag:
ctxGt1=ctxPar,
ctxGt2=ctxPar,
where ctxGt1 and ctxGt2 represent the context indices of the greater 1 and greater 2 flags, respectively.

It is noted that different sets of context models can be used for different types of the syntax elements, such as rem_abs_gt1_flag and rem_abs_gt2_flag. Thus, the context model used for rem_abs_gt1_flag is different from that of rem_abs_gt2_flag, even though a value of ctxGt1 is equal to that of ctxGt2.

A primary transform, such as a forward primary transform or an inverse primary transform can utilize a zero-out method or zero-out scheme as described below. In some examples, such as in VVC, for a 64-point (or 64-length) DCT-2, only the first 32 coefficients are calculated and the remaining coefficients are set as 0. Therefore, for an M×N block which is coded using a DCT-2 transform, the top-left min(M, 32)×min(N,32) low frequency coefficients are kept or calculated. The remaining coefficients can be set as 0 and not signaled. In an example, the remaining coefficients are not calculated. The entropy coding of the coefficient block can be performed by setting the coefficient block size as min(M, 32)×min(N,32), such that the coefficient coding of an M×N block is regarded as a min(M, 32)×min(N, 32) coefficient block.

In some examples in which MTS is used, for 32-point DST-7 or DCT-8, only the first 16 coefficients are calculated and the remaining coefficients are set as 0. Therefore, for an M×N block which is coded using a DST-7 or DCT-8 transform, the top-left min(M, 16)×min(N, 16) low frequency coefficients are kept. The remaining coefficients can be set as 0 and not signaled. However, different from the coefficient coding scheme which is used when 64-point zero-out DCT-2 is applied, for 32-point MTS, the coefficient coding is still performed on the whole M×N block even when M or N is larger than 16. However, when a coefficient group (CG) is outside the top-left 16×16 low-frequency region (i.e., the coefficient group is in a zero-out region) a flag indicating whether the coefficient group has a nonzero coefficient (e.g., a coded_sub_block_flag) is not signaled. The zero-out region refers to a region in the coefficient block where coefficients are zero, and thus the coefficients in the zero-out region are zero. An example of a residual coding syntax is described below, indicated by the highlighted texts using a frame 1301 in FIG. 13.

In an embodiment, a mode-dependent non-separable secondary transform (NSST) can be used between a forward core transform and a quantization (e.g., quantization of coefficients) at an encoder side and between a de-quantization (e.g., de-quantization of quantized coefficients) and an inverse core transform at a decoder side. For example, to keep a low complexity, a NSST is applied to low frequency coefficients after a primary transform (or a core transform). When both a width (W) and a height (H) of a transform coefficient block are larger than or equal to 8, an 8×8 NSST is applied to a top-left 8×8 region of the transform coefficients block. Otherwise, when either the width W or the height H of the transform coefficient block is 4, a 4×4 NSST is applied, and the 4×4 NSST is performed on a top-left min(8,W)×min(8,H) region of the transform coefficient block. The above transform selection method is applied for both luma and chroma components.

A matrix multiplication implementation of a NSST is described as follows using a 4×4 input block as an example. The 4×4 input block X is written in Eq. 13 as $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{Eq. 13}$$

The input block X can be represented as a vector $\vec{X}$ in Eq. 14 where $$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T \quad \text{Eq. 14}$$

The non-separable transform is calculated as $\vec{F} = T \cdot \vec{X}$, where $\vec{F}$ indicates a transform coefficient vector, and T is a 16×16 transform matrix. The 16×1 transform coefficient vector $\vec{F}$ is subsequently reorganized as a 4×4 block using a scanning order (for example, a horizontal scanning order, a vertical scanning order or a diagonal scanning order) for the input block X. Coefficients with smaller indices can be placed with smaller scanning indices in the 4×4 coefficient block.

The transform core of a secondary transform can be selected by an intra prediction mode. For each intra prediction mode, a set of secondary transform cores can be defined, and the selection can be indicated by an index that can be signaled in a bitstream and/or indicated by other syntax elements (e.g., MTS index).

To reduce the complexity for storing and calculating coefficients in a secondary transform, a zero-out scheme based secondary transform can be applied. When the secondary transform includes the zero-out scheme, the secondary transform only calculates the first K coefficients for an M×N block, where K is smaller than M×N. The remaining (M×N−K) coefficients can be set as 0. For example, the remaining (M×N−K) coefficients are not calculated.

In some embodiments, a sub-block transform (SBT), also referred to as spatially varying transform (SVT), is employed. The SBT can be applied to inter prediction residuals. In some examples, residual block is included in the coding block and is smaller than the coding block. Thus, a transform size in SBT is smaller than the coding block size. For the region which is not covered by the residual block, a zero residual can be assumed, and thus no transform processing is performed.

FIGS. 14A-14D shows sub-block types (SVT-H, SVT-V) (e.g., horizontally or vertically partitioned), sizes and positions (e.g., left half, left quarter, right half, right quarter, top half, top quarter, bottom half, bottom quarter) supported in SBT. The shaded regions labeled by letter "A" are residual blocks with transform, and the other regions are assumed to be zero residual without transform.

As an example, FIGS. 15A-15F show changes to a specification text of a video coding standard (e.g., VVC) when SBT is used. The changes including added texts are shown in frames from (2101) to (2108). As shown, additional syntax elements (e.g., additional overhead bits cu_sbt_flag, cu_sbt_quad_flag, cu_sbt_horizontal_flag, and cu_sbt_pos_flag) can be signaled to indicate the sub-block type (horizontal or vertical), size (half or quarter) and position (left, right, top or bottom), respectively.

An example of sequence parameter set RBSP semantics is given below. sps_sbt_enabled_flag equal to 0 specifies that sub-block transform for inter-predicted CU is disabled. sps_sbt_enabled_flag equal to 1 specifies that sub-block transform for inter-predicted CU is enabled.

An example of general slice header semantics is given below. slice_sbt_max_size_64_flag equal to 0 specifies that the maximum CU width and height for allowing sub-block transform is 32. slice_sbt_max_size_64_flag equal to 1 specifies that the maximum CU width and height for allowing sub-block transform is 64. A maxSbtSize can be determined as: maxSbtSize=slice_sbt_max_size_64_flag?64: 32

An example of coding unit semantics is given below. cu_sbt_flag[x0][y0] equal to 1 specifies that for the current coding unit, sub-block transform is used. cu_sbt_flag[x0][y0] equal to 0 specifies that for the current coding unit, the sub-block transform is not used. When cu_sbt_flag[x0][y0] is not present, its value is inferred to be equal to 0. When sub-block transform is used, a coding unit is tiled into two transform units, one transform unit has a residual, the other does not have a residual.

In some examples, cu_sbt_quad_flag[x0][y0] equal to 1 specifies that for the current coding unit, the sub-block transform include a transform unit of ¼ size of the current coding unit. In some examples, cu_sbt_quad_flag[x0][y0] equal to 0 specifies that for the current coding unit the sub-block transform include a transform unit of ½ size of the current coding unit. When cu_sbt_quad_flag[x0][y0] is not present, its value is inferred to be equal to 0.

In some examples, cu_sbt_horizontal_flag[x0][y0] equal to 1 specifies that the current coding unit is tiled into 2 transform units by a horizontal split. cu_sbt_horizontal_flag[x0][y0] equal to 0 specifies that the current coding unit is tiled into 2 transform units by a vertical split.

In some examples, when cu_sbt_horizontal_flag[x0][y0] is not present, its value is derived as follows: if cu_sbt_quad_flag[x0][y0] is equal to 1, cu_sbt_horizontal_flag[x0][y0] is set to be equal to allowSbtHoriQuad. Otherwise (cu_sbt_quad_flag[x0][y0] is equal to 0), cu_sbt_horizontal_flag[x0][y0] is set to be equal to allowSbtHoriHalf.

In some examples, cu_sbtpos_flag[x0][y0] equal to 1 specifies that the tu_cbf_luma, tu_cbf_cb and tu_cbf_cr of the first transform unit in the current coding unit are not present in the bitstream. cu_sbt_pos_flag[x0][y0] equal to 0 specifies that the tu_cbf_luma, tu_cbf_cb and tu_cbf_cr of the second transform unit in the current coding unit are not present in the bitstream.

An example of a transformation process for scaled transform coefficients is described below.

Inputs to the process are: a luma location (xTbY, yTbY) specifying the top-left sample of the current luma transform block relative to the top left luma sample of the current picture, a variable nTbW specifying the width of the current transform block, a variable nTbH specifying the height of the current transform block, a variable cIdx specifying the colour component of the current block, an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

If cu_sbt_flag[xTbY][yTbY] is equal to 1, the variable trTypeHor specifying the horizontal transform kernel and the variable trTypeVer specifying the vertical transform kernel are derived in Table 3 (shown in FIG. 15F) depending on cu_sbt_horizontal_flag[xTbY][yTbY] and cu_sbtpos_flag[xTbY][yTbY].

Otherwise (cu_sbt_flag[xTbY][yTbY] is equal to 0), the variable trTypeHor specifying the horizontal transform kernel and the variable trTypeVer specifying the vertical transform kernel are derived in Table 4 (shown in FIG. 15F) depending on mts_idx[xTbY][yTbY] and CuPredMode[xTbY][yTbY]. Table 3

The (nTbW)×(nTbH) array r of residual samples is derived as follows:

Each (vertical) column of scaled transform coefficients d[x][y] with x=0 . . . nTbW−1, y=0 . . . nTbH−1 is transformed to e[x][y] with x=0 . . . nTbW−1, y=0 . . . nTbH−1 by invoking the one-dimensional transformation process for each column x=0 . . . nTbW−1 with the height of the transform block nTbH, the list d[x][y] with y=0 . . . nTbH−1 and the transform type variable trType set equal to trTypeVer as inputs, and the output is the list e[x][y] with y=0 . . . nTbH−1.

The intermediate sample values g[x][y] with x=0 . . . nTbW−1, y=0 . . . nTbH−1 are derived as follows:

$$g[x][y]=Clip3(CoeffMin,CoeffMax,(e[x][y]+256)>>9)$$

Each (horizontal) row of the resulting array g[x][y] with x=0 . . . nTbW−1, y=0 . . . nTbH−1 is transformed to r[x][y] with x=0 . . . nTbW−1, y=0 . . . nTbH−1 by invoking the one-dimensional transformation process for each row y=0 . . . nTbH−1 with the width of the transform block nTbW, the list g[x][y] with x=0 . . . nTbW−1 and the transform type variable trType set equal to trTypeHor as inputs, and the output is the list r[x][y] with x=0 . . . nTbW−1.

In some examples, two different schemes of coefficient coding are applied for 64-point DCT-2 with zero-out and 32-point MTS with zero-out, and thus, the coefficient coding is not a unified design. The coefficient coding can refer to entropy coding of transform coefficients.

For the coefficient coding applied for 32-point MTS with zero-out, transform coefficients at a zero-out region may be scanned although the transform coefficients are assumed to be zero. If an encoder is not perfectly designed and the encoder can calculate a nonzero coefficient at the zero-out region. Thus, a CG at a boundary of a top-left non-zero region may still access the zero-out region to derive the context value used for entropy coding of the transform coefficients. The encoder and a decoder can get different context values (e.g., a non-zero value for the encoder and a zero value for the decoder) and thus, create un-predictable behavior for the decoder, such as crash or mismatch.

In some examples, SBT is applied which may use 32-point DST-7/DCT-8, so the transform zero-out when SBT is applied needs to be also designed properly.

A secondary transform can include a zero-out method, so the transform zero-out when the secondary transform is applied needs to be designed properly.

Embodiments described herein may be used separately or combined in any order. Further, the embodiments may be implemented by processing circuitry (e.g., one or more processors or one or more integrated circuits) in an encoder, a decoder, or the like. In one example, the one or more processors can execute a program that is stored in a non-transitory computer-readable medium.

In the present disclosure, embodiments that are applicable for DST-7 of an MTS candidate can be applicable to DST-4 and vice versa. Similarly, embodiments that are applicable for DCT-8 of an MTS candidate are also applicable to DCT-4 and vice versa.

In the present disclosure, a secondary transform can refer to NSST or Reduced Secondary Transform (RST) that is an alternative design of NSST. Embodiments that are applicable for NSST can be applicable for RST.

At a decoder side, a coefficient block including transform coefficients can be decoded into a residual block having residual data, and thus a TU can refer to the coefficient block or the residual block. In the present disclosure, a coefficient unit (or a coefficient set) can be defined as a set of transform coefficients (also referred to as coefficients) that includes all coefficients or a part of coefficients inside a TU or a coefficient block. For example, a coefficient unit may refer to a sub-block that is a minimum sub-block including all non-zero coefficients inside a coefficient block. For example, for a 64×64 TU coded using DCT-2 only, only low-frequency coefficients in a top-left 32×32 region are kept, and remaining coefficients in the 64×64 TU are set as 0, therefore, a coefficient unit is the top-left 32×32 region in the 64×64 TU. In another example, for a 32×32 TU coded using DST-7 or DCT-8, and only low-frequency coefficients in a top-left 16×16 region are kept, and remaining coefficients in the 32×32 TU are set as 0, therefore, a coefficient unit is the top-left 16×16 region in the 32×32 TU.

A TU may have multiple coefficient units, and the multiple coefficient units include all non-zero coefficients inside the TU (i.e., all the non-zero coefficients inside the TU are included in the multiple coefficient units). Accordingly, a coefficient in the TU that is outside the multiple coefficient units is zero.

Figure 16A:
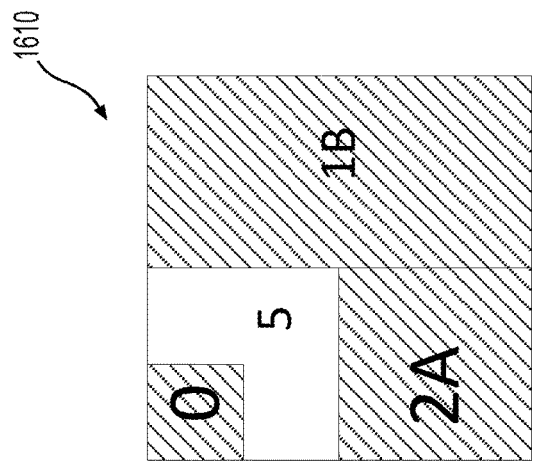
FIGS. 16A-16D show examples of coefficient units according to embodiments of the disclosure.

FIGS. 16A-16D show examples of coefficient units according to embodiments of the disclosure. Referring to FIG. 16A, a 16×16 coefficient block (1610) includes shaded regions 0, 1A, 2A, and 3A and a white region 5. The shaded regions 0, 1A, 2A, and 3A can include non-zero transform coefficients, and the white region 5 does not include non-zero transform coefficients (i.e., the transform coefficients in the white region 5 are zero). Referring to FIG. 16A, there are 4 coefficient units (e.g., the shaded regions 0, 1A, 2A, and 3A) in the coefficient block (1610).

Figure 16B:
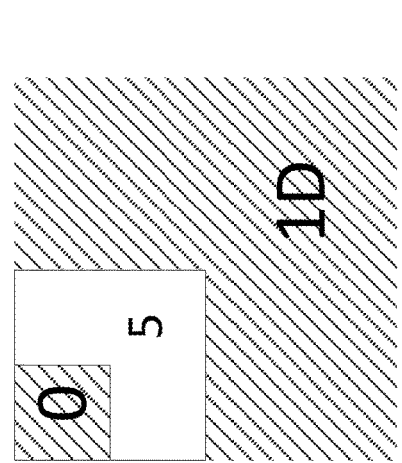

Referring to FIG. 16B, the coefficient block (1610) can be partitioned into the shaded regions 0 and 2A, shaded region 1B, and the white region 5. The shaded regions 0, 1B, and 2A can include non-zero transform coefficients, and the white region 5 does not include non-zero transform coefficients. Referring to FIG. 16B, there are 3 coefficient units (e.g., the shaded regions 0, 1B, and 2A) in the coefficient block (1610). Referring to FIGS. 6A and 6B, the shaded region 1B includes the shaded regions 1A and 3A.

Figure 16C:
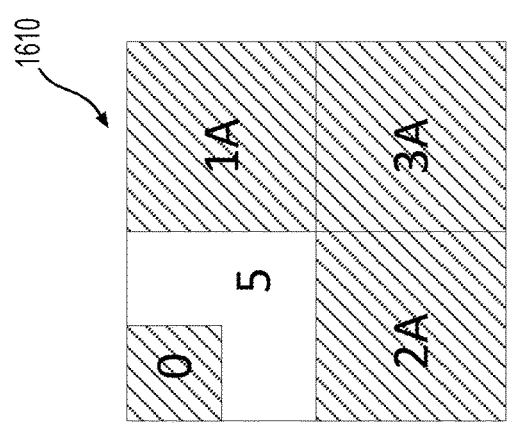

Referring to FIG. 16C, the coefficient block (1610) can be partitioned into the shaded regions 0 and 1A, shaded region 2C, and the white region 5. The shaded regions 0, 1A, and 2C can include non-zero transform coefficients, and the white region 5 does not include non-zero transform coefficients. Referring to FIG. 16C, there are 3 coefficient units (e.g., the shaded regions 0, 1A, and 2C) in the coefficient block (1610). Referring to FIGS. 6A and 6C, the shaded region 2C includes the shaded regions 2A and 3A.

Figure 16D:
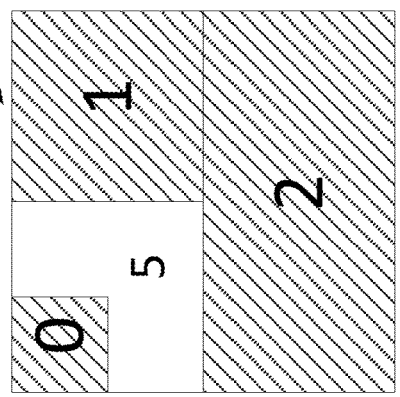

Referring to FIG. 16D, the coefficient block (1610) can be partitioned into the shaded region 0, shaded region 1D, and the white region 5. The shaded regions 0 and 1D can include non-zero transform coefficients, and the white region 5 does not include non-zero transform coefficients. Referring to FIG. 16D, there are 2 coefficient units (e.g., the shaded regions 0 and 1D) in the coefficient block (1610). Referring to FIGS. 6A and 6D, the shaded region 1D includes the shaded regions 1A, 2A, and 3A.

In general, a coefficient unit can have any suitable shape or size. Referring to FIGS. 16A-16D, a coefficient unit can have a square shape (e.g., the coefficient units 1A, 2A, 3A), a rectangular shape (e.g., the coefficient units 1B and 2C), an irregular shape (e.g., an 'L' shape of the coefficient unit 1D). Coefficient coding can be adapted accordingly such that coefficients in a zero-out region, such as the white region 5, are not signaled in bitstreams.

A coefficient block can be partitioned into different numbers of coefficient unit(s). For example, the coefficient block (1610) can be partitioned into 4, 3, 3, and 2 coefficient units as shown in FIGS. 16A-16D, respectively.

According to embodiments of the present disclosure, coefficient coding of a TU can be processed in a unit of a coefficient unit where each coefficient unit is coded independently. Thus, the coefficient coding of one coefficient unit in the TU does not need to access coded information of another coefficient unit in the TU.

Various processing orders can be used to process multiple coefficient units in a coefficient block. Referring to FIG. 16D, a processing circuitry can start processing the coefficient units 0 and 1D simultaneously. In an example, the processing circuitry can start processing the coefficient unit 0 prior to starting processing the coefficient unit 1D. In an example, the processing circuitry can start processing the coefficient unit 1D prior to starting processing the coefficient unit 0.

In some examples, a flag, i.e., a coefficient unit flag, can be used to indicate whether a coefficient unit includes at least a non-zero coefficient. For examples, 4 flags can be used for the coefficient units 0 and 1A-3A in FIG. 16A, respectively. Similarly, 3 flags can be used for the coefficient units 0, 1B, and 2A in FIG. 16B, respectively; 3 flags can be used for the coefficient units 0, 1A, and 2C in FIG. 16C, respectively; and 2 flags can be used for the coefficient units 0 and 1D in FIG. 16D, respectively.

In some examples, for each coefficient unit, a coefficient unit flag can be signaled. In an example, when a TU has only one coefficient unit, a coefficient unit flag of the one coefficient unit may be inferred from a coefficient block flag (CBF) of the TU, and thus, the coefficient unit flag is not signaled. The CBF of the TU can indicate whether the TU has at least one non-zero coefficient.

In an example, a TU is partitioned into multiple coefficient units, and the TU has non-zero coefficient(s). If only a last coefficient unit in a processing order has non-zero coefficient(s), then a coefficient unit flag of the last coefficient unit indicates that the last coefficient unit has non-zero coefficient(s) and is inferred without being signaled.

In an embodiment, the coefficient coding of a coefficient unit can be processed in a unit of a coefficient group (CG). A CG can include 16 coefficients in a coefficient unit. A CG can have any suitable shape, such as a square, a rectangular shape, or the like. For example, a CG can be a 4×4 sub-block, a 2×8 sub-block, or an 8×2 sub-block in a coefficient unit.

In an example, a coefficient unit includes multiple CGs and has non-zero coefficient(s). If only a last CG in a processing order has non-zero coefficient(s), then a flag (e.g., a coded_sub_block_flag) for the last CG that indicates whether the last CG has non-zero coefficient or not can be inferred without being signaled, and the flag for the last CG indicates that the last CG has at least one non-zero coefficient.

In an embodiment, for a TU coded without a secondary transform, the TU has only one coefficient unit.

In an example, if a primary transform including (or using) a zero-out method, a SBT, or a combination of a primary transform including a zero-out method and SBT, is applied to the TU, a size and a position of the coefficient unit can be inferred from the primary transform including the zero-out method and/or the SBT such that the coefficient unit includes non-zero region(s) after the primary transform including the zero-out method and/or the SBT. A non-zero region includes at least one non-zero coefficient.

In an example, if the TU does not have a pre-known zero-out region, such as due to a primary transform including a zero-out method, a SBT, or the like, as described above, the size and the position of the coefficient unit can be inferred to be the same as those of the TU. In an example, the coefficient unit is the TU.

In some embodiments, a primary transform is applied on an M×N coefficient block and uses a zero-out method where the primary transform can be a non-DCT-2 transform or a combination of a DCT-2 transform and a non-DCT-2 transform. The primary transform can include a horizontal M-point transform and a vertical N-point transform. Thus, when X is a number of coefficients kept or calculated for the horizontal M-point transform and Y is a number of coefficients kept or calculated for the vertical N-point transform, a ratio X/M is less than 1 and/or a ratio Y/N is less than 1. According to aspects of the disclosure, the entropy coding of the M×N coefficient block can be implemented by setting an entropy coding block size as min(M, X)×min(N, Y). Accordingly, when entropy coding the M×N coefficient block, the M×N coefficient block is regarded as a min(M, X)×min(N, Y) region, e.g., only transform coefficients in the top-left min(M, X)×min(N, Y) region are entropy coded and remaining coefficients are not entropy coded (e.g., the remaining coefficients are set as zero). Further, in an example, the remaining coefficients outside the top-left min(M, X)×min (N, Y) region are not accessed when entropy coding the top-left min(M, X)×min(N, Y) region.

In some examples, the non-DCT-2 transform is a 32-point DST-7/DCT-8 used in MTS, a 32-point DST-7/DCT-8 used in SBT, and/or a 32-point DST-7/DCT-8 used in implicit MTS. When X and Y are 16, the entropy coding block size is 16×16, and only the top-left 16×16 region is entropy coded. Further, in an example, the remaining coefficients outside the top-left 16×16 region are not accessed when entropy coding the top-left 16×16 region.

As described above, the primary transform (e.g., a non-DCT-2 transform or a combination of a DCT-2 transform and a non-DCT-2 transform) can be applied on the M×N coefficient block and use the zero-out method. The ratio X/M is less than 1 and/or the ratio Y/N is less than 1. Coefficients in a region that is outside the top-left min(M, X)×min(N, Y) region in the M×N coefficient block can be regarded as zero, and the region can be referred to as a zero-out region. According to aspects of the disclosure, the entropy coding of the M×N coefficient block can be implemented on the entire M×N coefficient block. However, when accessing a syntax element of a transform coefficient located in the zero-out region for deriving a context value used for entropy coding, for example, of a current coefficient, a default value of the transform coefficient can be used. The syntax element of the transform coefficient can also be referred to as the coefficient related syntax element.

In an example, when entropy coding a CG flag (e.g., a coded_sub_block_flag) of a current CG, one or more neighboring CG flags for respective one or more neighboring CGs can be used to derive a context value for entropy coding the CG flag of the current CG. However, if one of the one or more neighboring CGs is located in the zero-out region, a default value (e.g., 0) can be used for the one of the one or more neighboring CGs to derive the context value.

In an example, when entropy coding a syntax element (e.g., a coefficient related flag, such as a sig_coeff_flag, a par_level_flag, a rem_abs_gt1_flag, a rem_abs_gt2_flag, or the like,) of a current transform coefficient, syntax element(s) of a neighboring coefficient can be used to derive a context value for the current transform coefficient. When the neighboring coefficient is located in the zero-out region, a default value (e.g., 0) can be used instead.

FIG. 17 shows a 32×32 coefficient block (1710) including a first region (1720) and a second region (1730). The first region (1720) is a top-left 16×16 region in the coefficient block (1710) and the second region (1730) is outside the first region (1720). The first region (1720) includes CGs A-C, and the second region (1730) includes CGs AB, AR, BB, and CR. In an example, an entropy coding order is a reverse diagonal order that starts from a bottom-right corner of the coefficient block (1710) and ends at a top-left corner of the coefficient block (1710). Thus, the CGs AB and AR are entropy coded prior to the CG A, the CG BB is entropy coded prior to the CG B, and the CG CR is entropy coded prior to the CG C.

In an example, only transform coefficients in the first region (1720) are kept and remaining coefficients in the second region (1730) are set as 0, and thus the second region (1730) is also referred to as a zero-out region. For entropy coding of a first CG flag (e.g., a coded_sub_block_flag) of the CG A, the CG AR (a right CG) and the CG AB (a below CG) can be accessed to derive a context value for the first CG flag. Since the CGs AR and AB are located in the zero-out region (1730), default values (e.g., 0) can be assigned to CG flags of the CGs AR and AB, respectively.

For entropy coding of a second CG flag (e.g., a coded_sub_block_flag) for the CG B, the CG BB is to be accessed to derive a context value. Since the CG BB is located in the zero-out region (1730), a default value (e.g., 0) can be assigned to a CG flag of the CG BB. For entropy coding of a third CG flag (e.g., a coded_sub_block_flag) of the CG C, the CG CR is to be accessed to derive a context value. Since the CG CR is located in the zero-out region (1730), a default value (e.g., 0) can be assigned to a CG flag of the CG CR.

Figure 18:
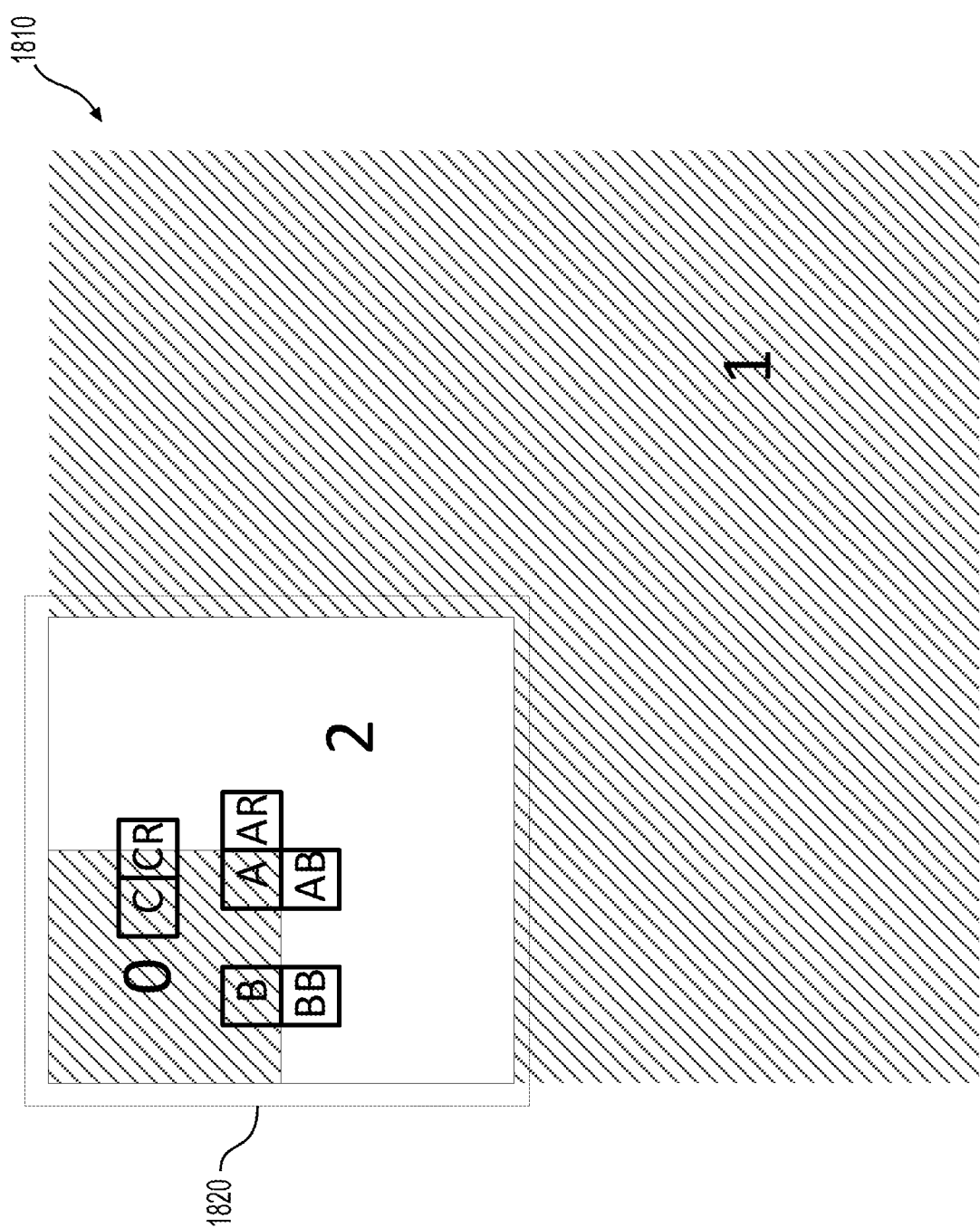
FIG. 18 shows an exemplary secondary transform including a zero-out method.

In some embodiments, a secondary transform including a zero-out method is applied on a top-left M×N region (1820) of an X×Y coefficient block (1810), as shown in FIG. 18. For example, the first 16 coefficients are kept and remaining (M×N−16) coefficients in the top-left M×N region (1820) are set as 0. In an example, X and Y are 32, M and N are 16, and thus the first 16 coefficients in a 4×4 region 0 are kept and the remaining (16×16−16) coefficients in a region 2 are set as 0. Thus, the region 2 is referred to as a zero-out region or a zero region. Referring to FIG. 18, the X×Y coefficient block (1810) includes three regions, the region 0, a region 1, and the region 2. The region 2 is the zero-out region that is due to the zero-out method in the secondary transform. The region 0 and/or the region 1 can have non-zero transform coefficient(s). The secondary transform does not apply on the region 1, i.e., the region 1 is not processed by the secondary transform.

Entropy coding of the X×Y coefficient block (1810) can be performed on the entire X×Y coefficient block (1810). However, when accessing a coefficient related syntax element (i.e., a syntax element of a coefficient) where the coefficient is located in the zero-out region 2 for deriving a context value used for entropy coding, a default value for the coefficient can be used.

In an embodiment, when entropy coding a CG flag (e.g., a coded_sub_block_flag) of a current CG, one or more neighboring CG flags of respective one or more neighboring CGs can be used to derive a context value for the CG flag. However, if one of the one or more neighboring CGs is fully located in the zero-out region 2 that is formed due to the secondary transform using the zero-out method, a default value (e.g., 0) can be used instead. Referring to FIG. 18, the region 0 includes CGs A, B, and C, and the region 2 (e.g., the zero-out region) includes CGs AB, AR, and BB. The CGs AB and AR are fully located in the zero-out region 2, and thus the default value (e.g., 0) can be used instead of CG flags of the CGs AB and AR to derive the context value for the first CG flag. The CG BB is fully located in the zero-out region 2, and thus, the default value (e.g., 0) can be used instead of a CG flag of the CG BB to derive the context value for the second CG flag.

In an embodiment, when entropy coding a CG flag (e.g., a coded_sub_block_flag) of a current CG, one or more neighboring CG flags of respective one or more neighboring CGs can be used to derive a context value for the CG flag. However, if one (e.g., a CG CR in FIG. 18) of the one or more neighboring CGs is partially located in the zero-out region 2, then non-zero coefficients in the one (e.g., the CG CR in FIG. 18) of the one or more neighboring CGs can be used to derive the context value.

In one embodiment, when entropy coding a syntax element (e.g., a coefficient related flag, such as a sig_coeff_flag, a par_level_flag, a rem_abs_gt1_flag, a rem_abs_gt2_flag or the like) for a current transform coefficient, the syntax element is not signaled. The current coefficient can be inferred as a default value that indicates that the current coefficient is 0 when the current coefficient is located in a zero-out region, such as the zero-out region 2.

In an embodiment, when entropy a syntax element (e.g., a coefficient related flag, such as a sig_coeff_flag, a par_level_flag, a rem_abs_gt1_flag, a rem_abs_gt2_flag or the like) for a current transform coefficient, one or more neighboring coefficients can be used to derive a context value for the syntax element. If one of the one or more neighboring coefficients is located in the zero region 2, a default value (e.g., 0) can be used instead.

Figure 19:
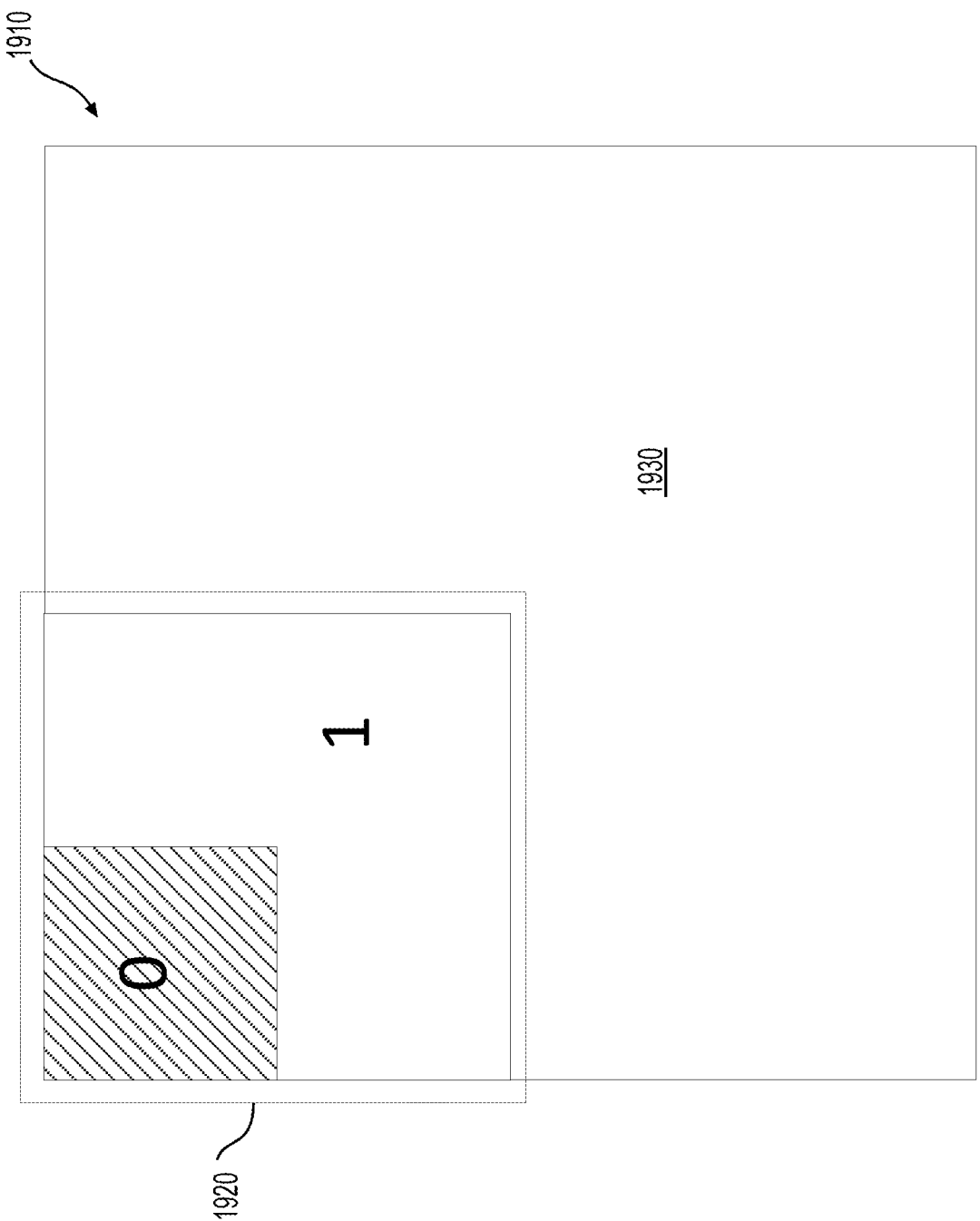
FIG. 19 shows an exemplary secondary transform including a zero-out method.

Referring to FIG. 19, in an embodiment, a coefficient block (1910) includes a first region (1920) and a second region (1930) that is outside the first region (1920). When a secondary transform (e.g., NSST or SBT) is applied to the first region (1920) and uses a zero-out method where only partial coefficients (e.g., in a top-left region 0) are kept, then the second region (1930) where the secondary transform is not applied can also be considered as a zero-out region. In an example shown in FIG. 19, a region 1 that is between the region 0 and the second region (1930) is a zero-out region due to the zero-out method used in the secondary transform. Accordingly, a combined zero-out region includes the region 1 and the second region (1930). In an example, the coefficient block (1910) includes only one coefficient unit (e.g., the region 0) and thus only the coefficient unit (e.g., the region 0) in the coefficient block (1910) is to be entropy coded.

In an embodiment, a size and a position of a coefficient unit in the coefficient block (1910) can be inferred based on the secondary transform including the zero-out method. In an example, when the secondary transform is an 8×8 secondary transform, the coefficient unit is the top-left 8×8 region (1920) of the coefficient block (1910). In an example, when the secondary transform is an 8×8 secondary transform on the first region (1920) including a zero-out method that keeps first 16 coefficients in the region 0, the coefficient unit is the top-left 4×4 region 0 of the first region (1920).

In an example, the secondary transform is an 8×8 secondary transform applied on the first region (1920) (e.g., a top-left 8×8 region in the coefficient block (1910)), the second region (1930) is outside the top-left 8×8 region (1920). When only 16 coefficients are kept in the secondary transform, the combined zero-out region is outside the top-left 4×4 region 0.

In an example, a coefficient block includes a first region of 4×4 and a second region that is outside the first region. When a secondary transform is applied to the first region and uses a zero-out method where only partial coefficients are kept, then the second region where the secondary transform is not applied can be considered as a zero-out region.

Figure 20:
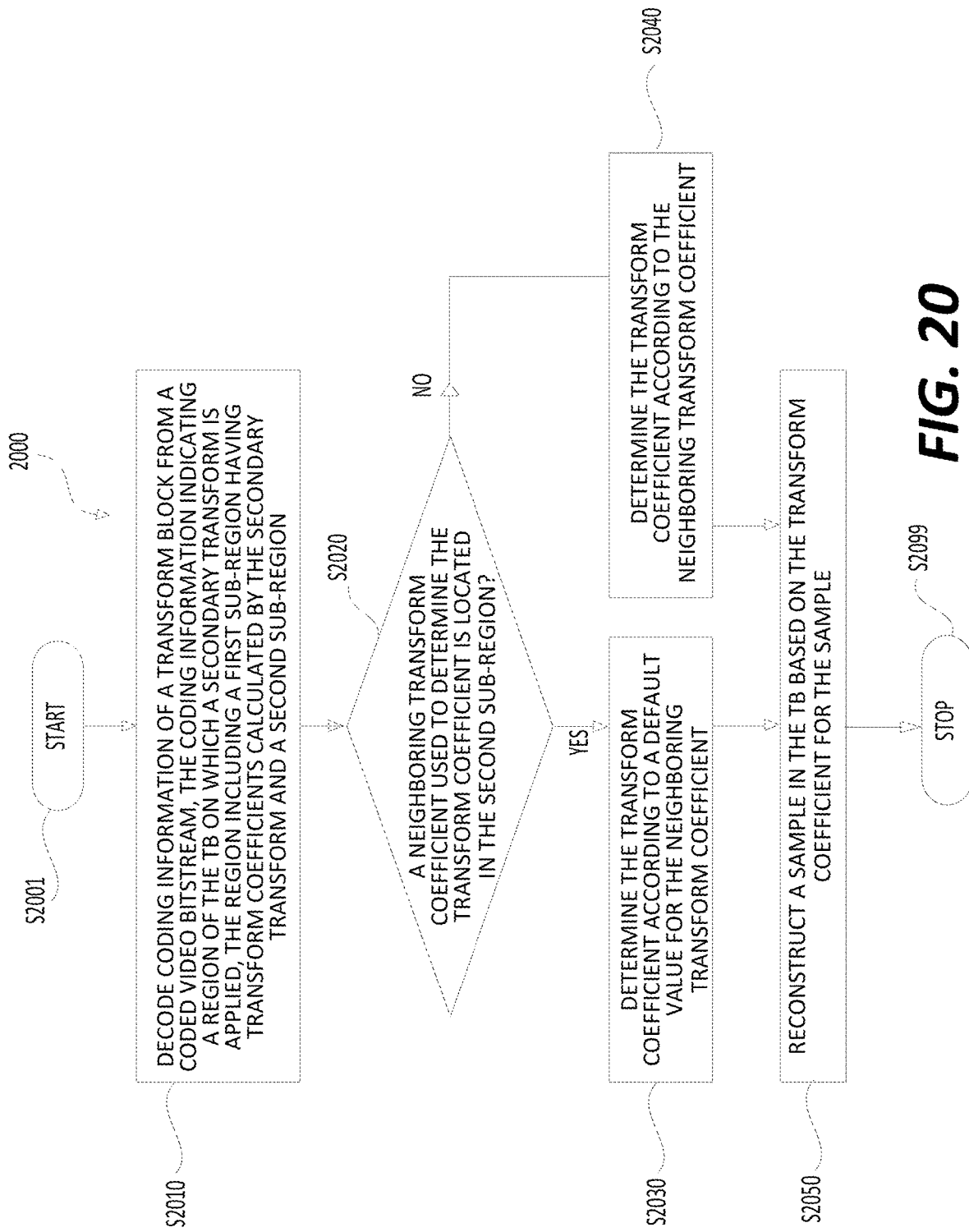
FIG. 20 shows a flow chart outlining a process (2000) according to an embodiment of the disclosure.

FIG. 20 shows a flow chart outlining a process (2000) according to an embodiment of the disclosure. The process (2000) can be used in the reconstruction of a block coded in intra mode, so to generate a prediction block for the block under reconstruction. In some examples, the process (2000) can be used in the reconstruction of a block coded in inter mode. In various embodiments, the process (2000) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2000) is implemented in software instructions, and thus when the processing circuitry executes the software instructions, the processing circuitry performs the process (2000). The process starts at (S2001) and proceeds to (S2010).

At (S2010), coding information of a TB, such as a coefficient block, from a coded video bitstream can be decoded. The coded information can indicate a region of the TB on which a secondary transform is applied where the region includes a first sub-region having transform coefficients calculated by the secondary transform and a second sub-region. In an example, the secondary transform uses a zero-out method, thus, transform coefficients in the second sub-region are not calculated by the secondary transform and are set as zero.

At (S2020), for a transform coefficient in the TB, whether a neighboring transform coefficient used to determine the transform coefficient is located in the second sub-region can be determined. When the neighboring transform coefficient is determined to be located in the second sub-region, the process (2000) proceeds to (S2030). Otherwise, the process (2000) proceeds to (S2040).

At (S2030), the transform coefficient can be determined according to a default value for the neighboring transform coefficient. In some examples, one or more syntax elements of the transform coefficient can be determined according to the default value (e.g., 0) for the neighboring transform coefficient. The syntax elements can include coefficient related flags, such as a sig_coeff_flag, a par_level_flag, a rem_abs_gt1_flag, a rem_abs_gt2_flag that indicate whether the transform coefficient is a non-zero transform coefficient; a parity of the transform coefficient; whether the transform coefficient is larger than 2; and whether the transform coefficient is larger than 4, respectively.

At (S2040), the transform coefficient can be determined according to the neighboring transform coefficient. In some examples, one or more syntax elements of the transform coefficient can be determined.

At (S2050), a sample in the TB can be reconstructed based on the transform coefficient for the sample.

The process (2000) can be suitably adapted. For example, one or more steps can be modified, omitted, or combined. An order that the process (2000) is executed can also be modified.

Additional step(s) can also be added. For example, the transform coefficient in the TB can be one of a plurality of transform coefficients in a first CG and a first CG flag for the first CG indicates whether at least one of the transform coefficients is a non-zero transform coefficient. A second CG includes transform coefficients is previously entropy decoded and is a neighbor of the first CG. The process (2000) can include a step that determines a location of the second CG. When the second CG is determined to be located in the second sub-region, the process (2000) can include a step that determines the first CG flag based on a default value for the second CG. Alternatively, when a portion of the second CG is located in the second sub-region and another portion of the second CG includes at least one non-zero coefficient, the process (2000) can include a step to determine the first CG flag based on the at least one non-zero coefficient.

In some examples, additional steps can include determining whether the transform coefficient is located in the second sub-region. When the transform coefficient is determined to be located in the second sub-region, the transform coefficient is determined not to be signaled and to be zero.

Figure 21:
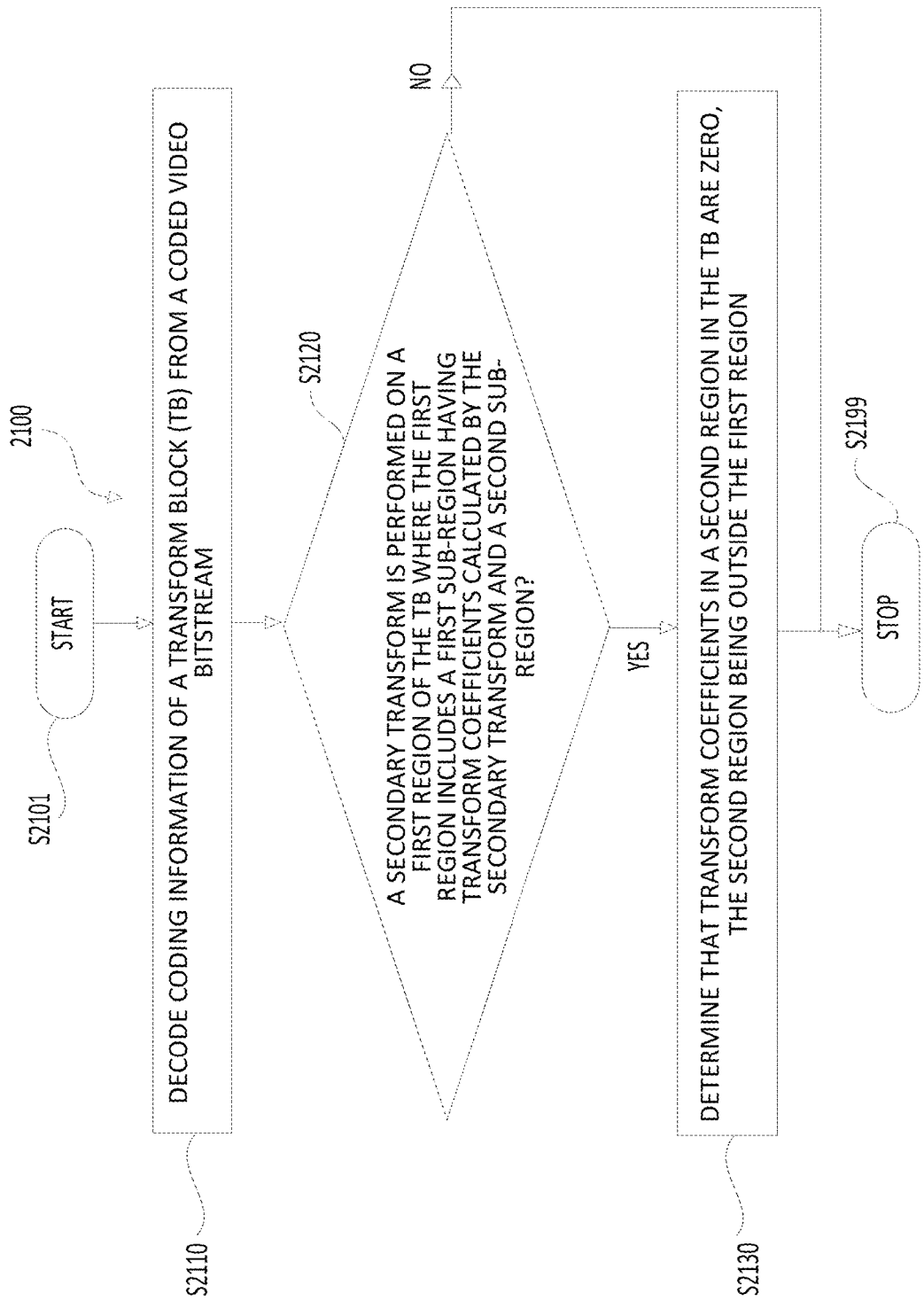
FIG. 21 shows a flow chart outlining a process (2100) according to an embodiment of the disclosure.

FIG. 21 shows a flow chart outlining a process (2100) according to an embodiment of the disclosure. The process (2100) can be used in the reconstruction of a block coded in intra mode, so to generate a prediction block for the block under reconstruction. In some examples, the process (2100) can be used in the reconstruction of a block coded in inter mode. In various embodiments, the process (2100) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2100) is implemented in software instructions, and thus when the processing circuitry executes the software instructions, the processing circuitry performs the process (2100). The process starts at (S2101) and proceeds to (S2110).

At (S2110), coded information of a transform block (TB) from a coded video bitstream can be decoded.

At (S2120), whether a secondary transform is performed on a first region of the TB can be determined based on the coding information where the first region includes a first sub-region having transform coefficients calculated by the secondary transform and a second sub-region. In an example, the secondary transform uses a zero-out method, thus, transform coefficients in the second sub-region are not calculated by the secondary transform and are set as zero. When the second transform is determined to be performed, the process (2100) proceeds to (S2130). Otherwise, the process (2100) proceeds to (S2199).

At (S2130), transform coefficients in a second region in the TB are determined to be zero where the second region is outside the first region.

The process (2100) can be suitably adapted. For example, one or more steps can be modified, omitted, or combined. Additional step(s) can also be added. For example, a size and a location of a coefficient unit in the TB are determined based on the first region and transform coefficients outside the coefficient unit are zero. An order that the process (2100) is executed can also be modified.

The techniques described above, can be implemented as computer software using computer-readable instructions and physically stored in one or more computer-readable media. For example, FIG. 22 shows a computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
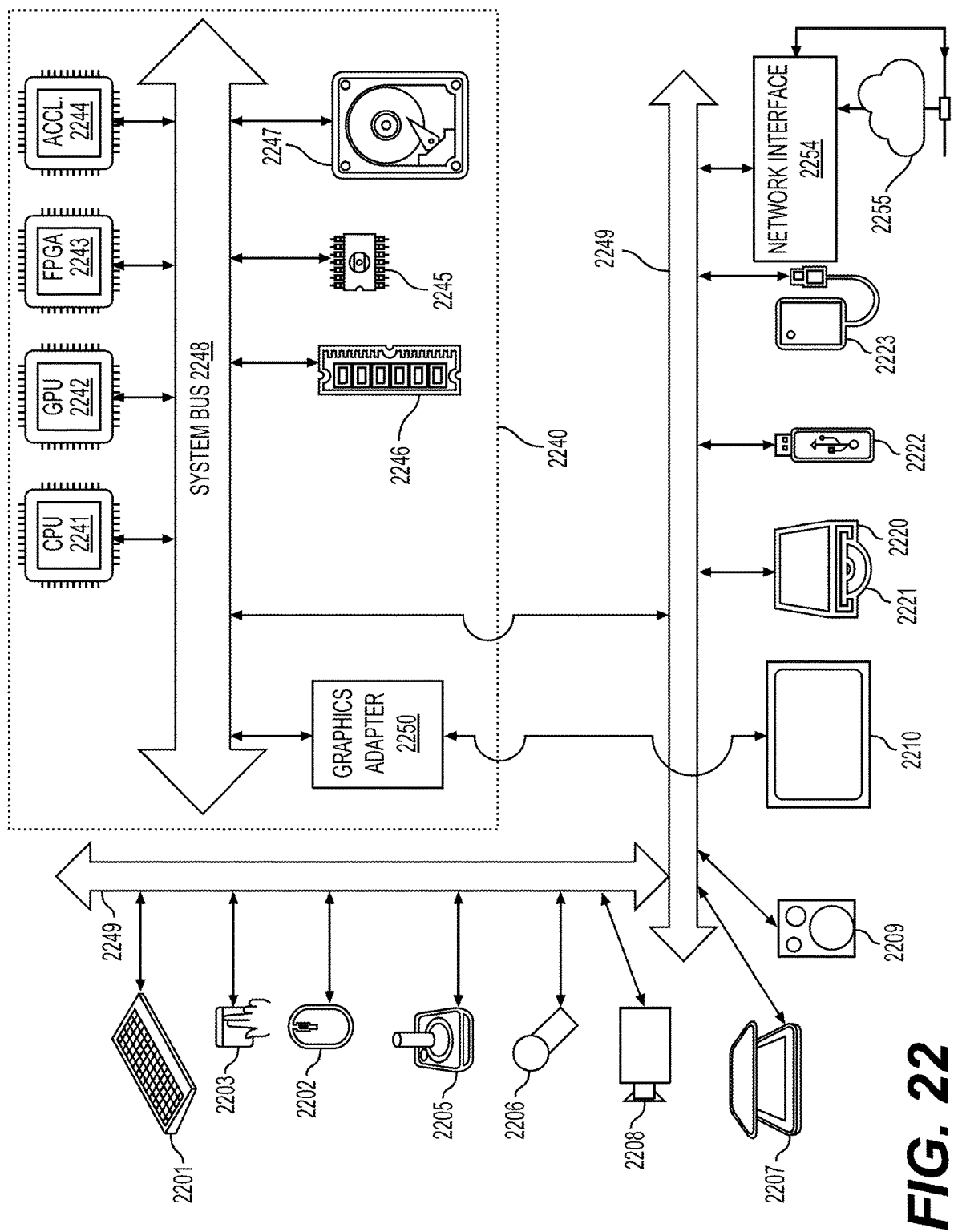
FIG. 22 is a schematic illustration of a computer system in accordance with an embodiment.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can be also be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2200), and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various embodiments of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hardwired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX I

4 × 4 transform
{64, 64, 64, 64}
{83, 36, −36, −83}
{64, −64,−64, 64}
{ 36, −83, 83,−36}
8 × 8 transform
{64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{ 36, −83, 83, −36, −36, 83, −83, 36}
{18, −50, 75, −89, 89, −75, 50, −18}
16 × 16 transform
{64 64 64 64 64 64 64 64 64 64 64 64 64 64 64 64}
{90 87 80 70 57 43 25 9 −9 −25 −43 −57 −70 −80 −87 −90}
{89 75 50 18 −18 −50 −75 −89 −89 −75 −50 −18 18 50 75 89}
{87 57 9 −43 −80 −90 −70 −25 25 70 90 80 43 −9 −57 −87}
{83 36 −36 −83 −83 −36 36 83 83 36 −36 −83 −83 −36 36 83}
{80 9 −70 −87 −25 57 90 43 −43 −90 −57 25 87 70 −9 −80}
{75 −18 −89 −50 50 89 18 −75 −75 18 89 50 −50 −89 −18 75}
{70 −43 −87 9 90 25 −80 −57 57 80 −25 −90 −9 87 43 −70}
{64 −64 −64 64 64 −64 −64 64 64 −64 −64 64 64 −64 −64 64}
{57 −80 −25 90 −9 −87 43 70 −70 −43 87 9 −90 25 80 −57}
{50 −89 18 75 −75 −18 89 −50 −50 89 −18 −75 75 18 −89 50}
{43 −90 57 25 −87 70 9 −80 80 −9 −70 87 −25 −57 90 −43}
{ 36 −83 83 −36 −36 83 −83 36 36 −83 83 −36 −36 83 −83 36}
{25 −70 90 −80 43 9 −57 87 −87 57 −9 −43 80 −90 70 −25}
{18 −50 75 −89 89 −75 50 −18 −18 50 −75 89 −89 75 −50 18}
{9 −25 43 −57 70 −80 87 −90 90 −87 80 −70 57 −43 25 −9}
32 × 32 transform
{64 64 64 64 64 64 64 64 64 64 64 64 64 64 64 64 64 64 64 64 64 64 64 64 64 64 64 64 64 64 64 64}
{90 90 88 85 82 78 73 67 61 54 46 38 31 22 13 4 −4 −13 −22 −31 −38 −46 −54 −61 −67 −73 −78 −82 −85 −88 −90 −90}
{90 87 80 70 57 43 25 9 −9 −25 −43 −57 −70 −80 −87 −90 −90 −87 −80 −70 −57 −43 −25 −9 9 25 43 57 70 80 87 90}
{90 82 67 46 22 −4 −31 −54 −73 −85 −90 −88 −78 −61 −38 −13 13 38 61 78 88 90 85 73 54 31 4 −22 −46 −67 −82 −90}
{89 75 50 18 −18 −50 −75 −89 −89 −75 −50 −18 18 50 75 89 89 75 50 18 −18 −50 −75 −89 −89 −75 −50 −18 18 50 75 89}
{88 67 31 −13 −54 −82 −90 −78 −46 −4 38 73 90 85 61 22 −22 −61 −85 −90 −73 −38 4 46 78 90 82 54 13 −31 −67 −88}
{87 57 9 −43 −80 −90 −70 −25 25 70 90 80 43 −9 −57 −87 −87 −57 −9 43 80 90 70 25 −25 −70 −90 −80 −43 9 57 87}
{85 46 −13 −67 −90 −73 −22 38 82 88 54 −4 −61 −90 −78 −31 31 78 90 61 4 −54 −88 −82 −38 22 73 90 67 13 −46 −85}
{83 36 −36 −83 −83 −36 36 83 83 36 −36 −83 −83 −36 36 83 83 36 −36 −83 −83 −36 36 83 83 36 −36 −83 −83 −36 36 83}
{82 22 −54 −90 −61 13 78 85 31 −46 −90 −67 4 73 88 38 −38 −88 −73 −4 67 90 46 −31 −85 −78 −13 61 90 54 −22 −82}
{80 9 −70 −87 −25 57 90 43 −43 −90 −57 25 87 70 −9 −80 −80 −9 70 87 25 −57 −90 −43 43 90 57 −25 −87 −70 9 80}
{78 −4 −82 −73 13 85 67 −22 −88 −61 31 90 54 −38 −90 −46 46 90 38 −54 −90 −31 61 88 22 −67 −85 −13 73 82 4 −78}
{75 −18 −89 −50 50 89 18 −75 −75 18 89 50 −50 −89 −18 75 75 −18 −89 −50 50 89 18 −75 −75 18 89 50 −50 −89 −18 75}
{73 −31 −90 −22 78 67 −38 −90 −13 82 61 −46 −88 −4 85 54 −54 −85 4 88 46 −61 −82 13 90 38 −67 −78 22 90 31 −73}
{70 −43 −87 9 90 25 −80 −57 57 80 −25 −90 −9 87 43 −70 −70 43 87 −9 −90 −25 80 57 −57 −80 25 90 9 −87 −43 70}
{67 −54 −78 38 85 −22 −90 4 90 13 −88 −31 82 46 −73 −61 61 73 −46 −82 31 88 −13 −90 −4 90 22 −85 −38 78 54 −67}
{64 −64 −64 64 64 −64 −64 64 64 −64 −64 64 64 −64 −64 64 64 −64 −64 64 64 −64 −64 64 64 −64 −64 64 64 −64 −64 64}
{61 −73 −46 82 31 −88 −13 90 −4 −90 22 85 −38 −78 54 67 −67 −54 78 38 −85 −22 90 4 −90 13 88 −31 −82 46 73 −61}
{57 −80 −25 90 −9 −87 43 70 −70 −43 87 9 −90 25 80 −57 −57 80 25 −90 9 87 −43 −70 70 43 −87 −9 90 −25 −80 57}
{54 −85 −4 88 −46 −61 82 13 −90 38 67 −78 −22 90 −31 −73 73 31 −90 22 78 −67 −38 90 −13 −82 61 46 −88 4 85 −54}
{50 −89 18 75 −75 −18 89 −50 −50 89 −18 −75 75 18 −89 50 50 −89 18 75 −75 −18 89 −50 −50 89 −18 −75 75 18 −89 50}
{46 −90 38 54 −90 31 61 −88 22 67 −85 13 73 −82 4 78 −78 −4 82 −73 −13 85 −67 −22 88 −61 −31 90 −54 −38 90 −46}
{43 −90 57 25 −87 70 9 −80 80 −9 −70 87 −25 −57 90 −43 −43 90 −57 −25 87 −70 −9 80 −80 9 70 −87 25 57 −90 43}
{38 −88 73 −4 −67 90 −46 −31 85 −78 13 61 −90 54 22 −82 82 −22 −54 90 −61 −13 78 −85 31 46 −90 67 4 −73 88 −38}

APPENDIX I-continued

{ 36 −83 83 −36 −36 83 −83 36 36 −83 83 −36 −36 83 −83 36 36 −83 83 −36 −36 83 −83 36 36 −83 83 −36 −36 83 −83 36}
{31 −78 90 −61 4 54 −88 82 −38 −22 73 −90 67 −13 −46 85 −85 46 13 −67 90 −73 22 38 −82 88 −54 −4 61 −90 78 −31}
{25 −70 90 −80 43 9 −57 87 −87 57 −9 −43 80 −90 70 −25 −25 70 −90 80 −43 −9 57 −87 87 −57 9 43 −80 90 −70 25}
{22 −61 85 −90 73 −38 −4 46 −78 90 −82 54 −13 −31 67 −88 88 −67 31 13 −54 82 −90 78 −46 4 38 −73 90 −85 61 −22}
{18 −50 75 −89 89 −75 50 −18 −18 50 −75 89 −89 75 −50 18 18 −50 75 −89 89 −75 50 −18 −18 50 −75 89 −89 75 −50 18}
{13 −38 61 −78 88 −90 85 −73 54 −31 4 22 −46 67 −82 90 −90 82 −67 46 −22 −4 31 −54 73 −85 90 −88 78 −61 38 −13}
{ 9 −25 43 −57 70 −80 87 −90 90 −87 80 −70 57 −43 25 −9 −9 25 −43 57 −70 80 −87 90 −90 87 −80 70 −57 43 −25 9}
{ 4 −13 22 −31 38 −46 54 −61 67 −73 78 −82 85 −88 90 −90 90 −90 88 −85 82 −78 73 −67 61 −54 46 −38 31 −22 13 −4}

APPENDIX II 64-point DCT-2 core
{
{ aa, aa, aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa }
{ bf, bg, bh, bi, bj, bk, bi, bm, bn, bo, bp, bq, br, bs, bt, bu, by, bw, bx, by, bz, ca, cb,
cc, cd, ce, cf, cg, ch, ci, cj, ck, −ck, −cj, −ci, −ch, −cg, −cf, −ce, −cd, −cc, −cb, −ca, −bz, −by, −bx,
−bw, −by, −bu, −bt, −bs, −br, −bq, −bp, −bo, −bn, −bm, −bi, −bk, −bj, −bi, −bh, −bg, −bf }
{ ap, aq, ar, as, at, au, ay, aw, ax, ay, az, ba, bb, bc, bd, be, −be, −bd, −bc, −bb, −ba, −az, −ay,
−ax, −aw, −ay, −au, −at, −as, −ar, −aq, −ap, −ap, −aq, −ar, −as, −at, −au, −ay, −aw, −ax, −ay, −az, −ba,
−bb, −bc, −bd, −be, be, bd, bc, bb, ba, az, ay, ax, aw, ay, au, at, as, ar, aq, ap }
{ bg, bj, bm, bp, bs, by, by, cb, ce, ch, ck, −ci, −cf, −cc, −bz, −bw, −bt, −bq, −bn, −bk, −bh, −bf,
−bi, −bi, −bo, −br, −bu, −bx, −ca, −cd, −cg, −cj, cj, cg, cd, ca, bx, bu, br, bo, bi, bi, bf, bh, bk, bn,
bq, bt, bw, bz, cc, cf, ci, −ck, −ch, −ce, −cb, −by, −by, −bs, −bp, −bm, −bj, −bg }
{ ah, ai, aj, ak, al, am, an, ao, −ao, −an, −am, −al, −ak, −aj, −ai, −ah, −ah, −ai, −aj, −ak, −al, −am, −an,
−ao, ao, an, am, al, ak, aj, ai, ah, ah, ai, aj, ak, al, am, an, ao, −ao, −an, −am, −al, −ak, −aj, −ai,
−ah, −ah, −ai, −aj, −ak, −al, −am, −an, −ao, ao, an, am, al, ak, aj, ai, ah }
{ bh, bm, br, bw, cb, cg, −ck, −cf, −ca, −by, −bq, −bl, −bg, −bi, −bn, −bs, −bx, −cc, −ch, cj, ce, bz,
bu, bp, bk, bf, bj, bo, bt, by, cd, ci, −ci, −cd, −by, −bt, −bo, −bj, −bf, −bk, −bp, −bu, −bz, −ce, −cj, ch,
cc, bx, bs, bn, bi, bg, bl, bq, by, ca, cf, ck, −cg, −cb, −bw, −br, −bm, −bh }
{ aq, at, aw, az, bc, −be, −bb, −ay, −ay, −as, −ap, −ar, −au, −ax, −ba, −bd, bd, ba, ax, au, ar, ap, as,
ay, ay, bb, be, −bc, −az, −aw, −at, −aq, −aq, −at, −aw, −az, −bc, be, bb, ay, ay, as, ap, ar, au, ax,
ba, bd, −bd, −ba, −ax, −au, −ar, −ap, −as, −ay, −ay, −bb, −be, bc, az, aw, at, aq }
{ bi, bp, bw, cd, ck, −ce, −bx, −bq, −bj, −bh, −bo, −by, −cc, −cj, cf, by, br, bk, bg, bn, bu, cb, ci,
−cg, −bz, −bs, −bi, −bf, −bm, −bt, −ca, −ch, ch, ca, bt, bm, bf, bi, bs, bz, cg, −ci, −cb, −bu, −bn, −bg,
−bk, −br, −by, −cf, cj, cc, by, bo, bh, bj, bq, bx, ce, −ck, −cd, −bw, −bp, −bi }
{ ad, ae, af, ag, −ag, −af, −ae, −ad, −ad, −ae, −af, −ag, ag, af, ae, ad, ad, ae, af, ag, −ag, −af, −ae,
−ad, −ad, −ae, −af, −ag, ag, af, ae, ad, ad, ae, af, ag, −ag, −af, −ae, −ad, −ad, −ae, −af, −ag, ag, af, ae,
ad, ad, ae, af, ag, −ag, −af, −ae, −ad, −ad, −ae, −af, −ag, ag, af, ae, ad }
{ bj, bs, cb, ck, −cc, −bt, −bk, −bi, −br, −ca, −cj, cd, bu, bi, bh, bq, bz, ci, −ce, −by, −bm, −bg, −bp,
−by, −ch, cf, bw, bn, bf, bo, bx, cg, −cg, −bx, −bo, −bf, −bn, −bw, −cf, ch, by, bp, bg, bm, by,
ce, −ci, −bz, −bq, −bh, −bi, −bu, −cd, cj, ca, br, bi, bk, bt, cc, −ck, −cb, −bs, −bj }
{ ar, aw, bb, −bd, −ay, −at, −ap, −au, −az, −be, ba, ay, aq, as, bc, −bc, −as, −aq, −ay, −ba,
be, az, au, ap, at, ay, bd, −bb, −aw, −ar, −ar, −aw, −bb, bd, ay, at, ap, au, az, be, −ba, −ay, −aq,
−as, −ax, −bc, bc, ax, as, aq, ay, ba, −be, −az, −au, −ap, −at, −ay, −bd, bb, aw, ar }
{ bk, by, cg, −ce, −bt, −bi, −bm, −bx, −ci, cc, br, bg, bo, bz, ck, −ca, −bp, −bf, −bq, −cb, cj, by,
bn, bh, bs, cd, −ch, −bw, −bi, −bj, −bu, −cf, cf, bu, bj, bi, bw, ch, −cd, −bs, −bh, −bn, −by, −cj, cb,
bq, bf, bp, ca, −ck, −bz, −bo, −bg, −br, −cc, ci, bx, bm, bi, bt, ce, −cg, −by, −bk }
{ ai, al, ao, −am, −aj, −ah, −ak, −an, an, ak, ah, aj, am, −ao, −al, −ai, −ai, −al, −ao, am, aj, ah, ak,
an, −an, −ak, −ah, −aj, −am, ao, al, ai, ai, al, ao, −am, −aj, −ah, −ak, −an, an, ak, ah, aj, am, −ao,
−al, −ai, −ai, −al, −ao, am, aj, ah, ak, an, −an, −ak, −ah, −aj, −am, ao, al, ai }
{ bl, by, −ck, −bx, −bk, −bm, −bz, cj, bw, bj, bn, ca, −cl, −by, −bi, −bo, −cb, ch, bu, bh, bp, cc,
−cg, −bt, −bg, −bq, −cd, cf, bs, bf, br, ce, −ce, −br, −bf, −bs, −cf, cd, bq, bg, bt, cg, −cc, −bp, −bh,
−bu, −ch, cb, bo, bi, by, cl, −ca, −bn, −bj, −bw, −cj, bz, bm, bk, bx, ck, −by, −bl }
{ as, az, −bd, −aw, −ap, −ay, −bc, ba, at, ar, ay, −be, −ax, −aq, −au, −bb, bb, au, aq, ax, be, −ay,
−ar, −at, −ba, bc, ay, ap, aw, bd, −az, −as, −as, −az, bd, aw, ap, ay, bc, −ba, −at, −ar, −ay, be, ax,
aq, au, bb, −bb, −au, −aq, −ax, −be, ay, ar, at, ba, −bc, −ay, −ap, −aw, −bd, az, as }
{ bm, cb, −cf, −bq, −bi, −bx, cj, bu, bf, bt, ci, −by, −bj, −bp, −ce, cc, bn, bi, ca, −cg, −br, −bh, −bw,
ck, by, bg, bs, ch, −bz, −bk, −bo, −cd, cd, bo, bk, bz, −ch, −bs, −bg, −by, −ck, bw, bh, br, cg, −ca,
−bl, −bn, −cc, ce, bp, bj, by, −ci, −bt, −bf, −bu, −cj, bx, bi, bq, cf, −cb, −bm }
{ ab, ac, −ac, −ab, −ab, −ac, ac, ab, ab, ac, −ac, −ab, −ab, −ac, ac, ab, ab, ac, −ac, −ab, −ab, −ac, ac,
ab, ab, ac, −ac, −ab, −ab, −ac, ac, ab, ab, ac, −ac, −ab, −ab, −ac, ac, ab, ab, ac, −ac, −ab, −ab, −ac,
ac, ab, ab, ac, −ac, −ab, −ab, −ac, ac, ab, ab, ac, −ac, −ab, −ab, −ac, ac, ab }
{ bn, ce, −ca, −bj, −br, −ci, bw, bf, by, −cj, −bs, −bi, −bz, cf, bo, bm, cd, −cb, −bk, −bq, −ch, bx,
bg, bu, −ck, −bt, −bh, −by, cg, bp, bi, cc, −cc, −bi, −bp, −cg, by, bh, bt, ck, −bu, −bg, −bx, ch, bq,
bk, cb, −cd, −bm, −bo, −cf, bz, bi, bs, cj, −by, −bf, −bw, ci, br, bj, ca, −ce, −bn }
{ at, bc, −ay, −ap, −ax, bd, au, as, bb, −az, −aq, −aw, be, ay, ar, ba, −ba, −ar, −ay, −be, aw, aq,
az, −bb, −as, −au, −bd, ax, ap, ay, −bc, −at, −at, −bc, ay, ap, ax, −bd, −au, −as, −bb, az, aq, aw, −be,

APPENDIX II-continued

-ay, -ar, -ba, ba, ar, ay, be, -aw, -aq, -az, bb, as, au, bd, -ax, -ap, -ay, bc, at }
{ bo, ch, -by, -bh, -ca, cc, bj, bt, -cj, -bq, -bm, -cf, bx, bf, by, -ce, -bi, -br, -ck, bs, bk, cd, -bz, -bg, -bw, cg, bn, bp, ci, -bu, -bi, -cb, cb, bi, bu, -ci, -bp, -bn, -cg, bw, bg, bz, -cd, -bk, -bs, ck, br, bi, ce, -by, -bf, -bx, cf, bm, bq, cj, -bt, -bj, -cc, ca, bh, by, -ch, -bo }
{ aj, ao, -ak, -ai, -an, al, ah, am, -am, -ah, -al, an, ai, ak, -aj, -aj, -ao, ak, ai, an, -al, -ah, -am, am, ah, al, -an, -ai, -ak, ao, aj, aj, ao, -ak, -ai, -an, al, ah, am, -am, -ah, -al, an, ai, ak, -ao, -aj, -aj, -ao, ak, ai, an, -al, -ah, -am, am, ah, al, -an, -ai, -ak, ao, aj }
{ bp, ck, -bq, -bo, -cj, br, bn, ci, -bs, -bm, -ch, bt, bl, cg, -bu, -bk, -cf, by, bj, ce, -bw, -bi, -cd, bx, bh, -cc, -by, -bg, -cb, bz, bf, ca, -ca, -bf, -bz, cb, bg, by, -ce, -bh, -bx, cd, bi, bw, -ce, -bj, -by, cf, bk, bu, -cg, -bl, -bt, ch, bm, bs, -ci, -bn, -br, cj, bo, bq, -ck, -bp }
{ au, -be, -at, -ay, bd, as, aw, -be, -ar, -ax, bb, aq, ay, -ba, -ap, -az, az, ap, ba, -ay, -aq, -bb, ax, ar, be, -aw, -as, -bd, ay, at, be, -au, -au, be, at, ay, -bd, -as, -aw, be, ar, ax, -bb, -aq, -ay, ba, ap, az, -az, -ap, -ba, ay, aq, bb, -ax, -ar, -be, aw, as, bd, -ay, -at, -be, au }
{ bq, -ci, -bi, -by, cd, bg, ca, -by, -bi, -cf, bt, bn, ck, -bo, -bs, cg, bj, bx, -cb, -bf, -cc, bw, bk, ch, -br, -bp, cj, bm, bu, -ce, -bh, -bz, bz, bh, ce, -bu, -bm, -cj, bp, br, -ch, -bk, -bw, cc, bf, cb, -bx, -bj, -cg, bs, bo, -ck, -bn, -bt, cf, bi, by, -ca, -bg, -cd, by, bi, ci, -bq }
{ ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae }
{ br, -cf, -bg, -cc, bu, bo, -ci, -bj, -bz, bx, bi, ck, -bm, -bw, ca, bi, ch, -bp, -bt, cd, bf, ce, -bs, -bq, cg, bh, cb, -by, -bn, cj, bk, by, -by, -bk, -cj, bn, by, -cb, -bh, -cg, bq, bs, -ce, -bf, -cd, bt, bp, -ch, -bi, -ca, bw, bm, -ck, -bi, -bx, bz, bj, ci, -bo, -bu, cc, bg, cf, -br }
{ av, -bb, -ap, -be, au, aw, -ba, -aq, -bd, at, ax, -az, -ar, -be, as, ay, -ay, -as, be, ar, az, -ax, -at, bd, aq, ba, -aw, -au, be, ap, bb, -ay, -ay, bb, ap, be, -au, -aw, ba, aq, bd, -at, -ax, az, ar, be, -as, -ay, ay, as, -be, -ar, -az, ax, at, -bd, -aq, -ba, aw, au, -be, -ap, -bb, av }
{ bs, -cc, -bi, -cj, bi, bz, -by, -bp, cf, bf, cg, -bo, -bw, by, bm, -ci, -bh, -cd, br, bt, -cb, -bj, -ck, bk, ca, -bu, -bq, ce, bg, ch, -bn, -bx, bx, bn, -ch, -bg, -ce, bq, bu, -ca, -bk, ck, bj, cb, -bt, -br, cd, bh, ci, -bm, -by, bw, bo, -cg, -bf, -cf, bp, by, -bz, -bi, cj, bi, cc, -bs }
{ ak, -am, -ai, ao, ah, an, -aj, -al, al, aj, -an, -ah, -ao, ak, -am, am, ai, -ao, -ah, -an, aj, al, -al, -aj, an, ah, -ao, -ai, -am, ak, ak, -am, -ai, ao, ah, an, -aj, -al, al, aj, -an, -ah, -ao, ai, am, -ak, -ak, am, ai, -ao, -ah, -an, aj, al, -al, -aj, an, ah, ao, -ai, -am, ak }
{ bt, -bz, -bn, cf, bh, ck, -bi, -ce, bo, by, -bu, -bs, ca, bm, -cg, -bg, -cj, bj, cd, -bp, -bx, by, br, -cb, -bl, ch, bf, ci, -bk, -cc, bq, bw, -bw, -bq, cc, bk, -ci, -bf, -ch, bl, cb, -br, -by, bx, bp, -cd, -bj, cj, bg, cg, -bm, -ca, bs, bu, -by, -bo, ce, bi, -ck, -bh, -cf, bn, bz, -bt }
{ aw, -ay, -au, ba, as, -be, -aq, be, ap, bd, -ar, -bb, at, az, -ay, -ax, ax, ay, -az, -at, bb, ar, -bd, -ap, -be, aq, be, -as, -ba, au, ay, -aw, -aw, ay, au, -ba, -as, be, aq, -be, -ap, -bd, ar, bb, -at, -az, ay, ax, -ax, -ay, az, at, -bb, -ar, bd, ap, be, -aq, -be, as, ba, -au, -ay, aw }
{ bu, -bw, -bs, by, bq, -ca, -bo, cc, bm, -ce, -bk, cg, bi, -cb, bf, cj, -bh, -ch, bj, cf, -bi, -cd, bn, cb, -bp, -bz, br, bx, -bt, -by, by, bt, -bx, -br, bz, bp, -cb, -bn, cd, bi, -cf, -bj, ch, bh, -cj, -bf, -ck, bg, ci, -bi, -cg, bk, ce, -bm, -cc, bo, ca, -bq, -by, bs, bw, -bu }
{ aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa }
{ bv, -bt, -bx, br, bz, -bp, -cb, bn, cd, -bi, -cf, bj, ch, -bh, -cj, bf, -ck, -bg, ci, bi, -cg, -bk, ce, bm, -cc, -bo, ca, bq, -by, -bs, bw, bu, -bu, -bw, bs, by, -bq, -ca, bo, cc, -bm, -ce, bk, cg, -bi, -ci, bg, ck, -bf, -cj, bh, -ch, -bj, cf, bi, -cd, -bn, cb, bp, -bz, -br, bx, bt, -bv }
{ ax, -ay, -az, at, bb, -ar, -bd, ap, -be, -aq, be, as, -ba, -au, ay, aw, -aw, -ay, au, ba, -as, -bc, aq, be, -ap, bd, ar, -bb, -at, az, ay, -ax, -ax, ay, az, -at, -bb, ar, bd, -ap, be, aq, -be, -as, ba, au, -ay, -aw, aw, ay, -au, -ba, as, be, -aq, -be, ap, -bd, -ar, bb, at, -az, -ay, ax }
{ bw, -bq, -cc, bk, ci, -bf, ch, bi, -cb, -br, by, bx, -bp, -cd, bj, cj, -bg, cg, bm, -ca, -bs, bu, by, -bo, -ce, bi, ck, -bh, cf, bn, -bz, -bt, bt, bz, -bn, -cf, bh, -ck, -bi, ce, bo, -by, -bu, bs, ca, -bm, -cg, bg, -cj, -bj, cd, bp, -bx, -by, br, cb, -bi, -ch, bf, -ci, -bk, cc, bq, -bw }
{ al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al, al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al }
{ bx, -bn, -ch, bg, -ce, -bq, bu, ca, -bk, -ck, bj, -cb, -bt, br, cd, -bh, ci, bm, -by, -bw, bo, cg, -bf, cf, bp, -by, -bz, bi, cj, -bi, cc, bs, -bs, -cc, bi, -cj, -bi, bz, by, -bp, -cf, bf, -cg, -bo, bw, by, -bm, -ci, bh, -cd, -br, bt, cb, -bj, ck, bk, -ca, -bu, bq, ce, -bg, ch, bn, -bx }
{ ay, -as, -be, ar, -az, -ax, at, bd, -aq, ba, aw, -au, -bc, ap, -by, ay, bb, -ap, bc, au, -aw, -ba, aq, -bd, -at, ax, az, -ar, be, as, -ay, -ay, as, be, -ar, az, ax, -at, -bd, aq, -ba, -aw, au, bc, -ap, by, -ay, -bb, ap, -bc, -au, aw, ba, -aq, bd, at, -ax, -az, ar, -be, -as, ay }
{ by, -bk, cj, bn, -by, -cb, bh, -cg, -bq, bs, ce, -bf, cd, bt, -bp, -ch, bi, -ca, -bw, bm, ck, -bl, bx, bz, -bj, ci, bo, -bu, -cc, bg, -cf, -br, cf, -bg, cc, bu, -bo, -ci, bj, -bz, -bx, bi, -ck, -bm, bw, ca, -bi, ch, bp, -bt, -cd, bf, -ce, -bs, bq, cg, -bh, cb, by, -bn, -cj, bk, -by }
{ af, -ad, ag, ae, -ae, -ag, ad, -af, -af, ad, -ag, -ae, ae, ag, -ad, af, af, -ad, ag, ae, -ae, -ag, ad, -al, -af, ad, -ag, -ae, ae, ag, -ad, af, af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af }
{ bz, -bh, ce, bu, -bm, cj, bp, -br, -ch, bk, -bw, -cc, bf, -cb, -bs, bj, -cg, -bs, bo, ck, -bn, bt, cf, -bi, by, ca, -bg, cd, by, -bi, ci, bq, -bq, -ci, bi, -by, -cd, bg, -ca, -by, bi, -cf, -bt, bn, -ck, -bo, bs, cg, -bj, bx, cb, -bf, cc, bw, -bk, ch, br, -bp, -cj, bm, -bu, -ce, bh, -bz }
{ az, -ap, ba, ay, -aq, bb, ax, -ar, bc, aw, -as, bd, ay, -at, be, au, -au, -be, at, -ay, -bd, as, -aw, -bc, ar, -ax, -bb, aq, -ay, -ba, ap, -az, -az, ap, -ba, -ay, aq, -bb, -ax, ar, -bc, -aw, as, -bd, -ay, at, -be, -au, au, be, -at, ay, bd, -as, aw, bc, -ar, ax, bb, -aq, ay, ba, -ap, az }
{ ca, -bf, bz, cb, -bg, by, cc, -bh, bx, cd, -bi, bw, ce, -bj, bv, cf, -bk, bu, cg, -bi, bt, ch, -bm, bs, ci, -bn, br, cj, -bo, bq, ck, -bp, bp, -ck, -bq, bo, -cj, -br, bn, -ci, -bs, bm, -ch, -bt, bl, -cg, -bu, bk, -cf, -by, bj, -se, -bw, bi, -cd, -bx, bh, -cc, -by, bg, -cb, -bz, bf, -ca }
{ am, -ah, al, an, -ai, ak, ao, -aj, aj, -ao, -ak, ai, -an, -al, ah, -am, -am, ah, -al, -an, ai, -ak, -ao, aj, -aj, ao, ak, -ai, an, al, -ah, am, am, -ah, al, an, -ai, ak, ao, -aj, aj, -ao, -ak, ai, -an, -al, ah, -am, -am, ah, -al, -an, ai, -ak, -ao, aj, -aj, ao, ak, -ai, an, al, -ah, am }

APPENDIX II-continued

{ cb, −bi, bu, ci, −bp, bn, −cg, −bw, bg, −bz, −cd, bk, −bs, −ck, br, −bi, ce, by, −bf, bx, cf, −bm, bq, −cj, −bt, bj, −cc, −ca, bh, −by, −ch, bo, −bo, ch, by, −bh, ca, cc, −bj, bt, cj, −bq, bm, −cf, −bx, bf, −by, −se, bi, −br, ck, bs, −bk, cd, bz, −bg, bw, cg, −bn, bp, −ci, −bu, bi, −cb }

{ ba, −ar, ay, −be, −aw, aq, −az, −bb, as, −au, bd, ax, −ap, ay, bc, −at, at, −bc, −ay, ap, −ax, −bd, au, −as, bb, az, −aq, aw, be, −ay, ar, −ba, −ba, ar, −ay, be, aw, −aq, az, bb, −as, au, −bd, −ax, ap, −ay, −bc, at, −at, bc, ay, −ap, ax, bd, −au, as, −bb, −az, aq, −aw, −be, ay, −ar, ba }

{ cc, −bi, bp, −cg, −by, bh, −bt, ck, bu, −bg, bx, ch, −bq, bk, −cb, −cd, bm, −bo, cf, bz, −bi, bs, −cj, −by, bf, −bw, −ci, br, −bj, ca, ce, −bn, bn, −se, −ca, bj, −br, ci, bw, −bf, by, cj, −bs, bi, −bz, −cf, bo, −bm, cd, cb, −bk, bq, −ch, −bx, bg, −bu, −ck, bt, −bh, by, cg, −bp, bi, −cc }

{ ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac }

{ cd, −bo, bk, −bz, −ch, bs, −bg, by, −ck, −bw, bh, −br, cg, ca, ck, −bz, bo, −bg, br, −bj, by, ci, −bt, bf, −bu, cj, bx, −bi, bq, −cf, −cb, bm, −bm, cb, cf, −bq, bi, −bx, −cj, bu, −bf, bt, −ci, −by, bj, −bp, ce, cc, −bn, bi, −ca, −cg, br, −bh, bw, ck, −by, bg, −bs, ch, bz, −bk, bo, −cd }

{ bb, −au, aq, −ax, be, ay, −ar, at, −ba, −bc, ay, −ap, aw, −bd, −az, as, −as, az, bd, −aw, ap, −ay, bc, ba, −at, ar, −ay, −be, ax, −aq, au, −bb, −bb, au, −aq, ax, −be, −ay, ar, −at, ba, bc, −ay, ap, −aw, bd, az, −as, as, −az, −bd, aw, −ap, ay, −bc, −ba, at, −ar, ay, be, −ax, aq, −au, bb }

{ ce, −br, bf, −bs, cf, cd, −bq, bg, −bt, cg, cc, −bp, bh, −bu, ch, cb, −bo, bi, −by, ci, ca, −bn, bj, −bw, cj, bz, −bm, bk, −bx, ck, by, −bi, bi, −by, −ck, bx, −bk, bm, −bz, −cj, bw, −bj, bn, −ca, −ci, by, −bi, bo, −cb, −ch, bu, −bh, bp, −cc, −cg, bt, −bg, bq, −cd, −cf, bs, −cf, br, −ce }

{ an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an, an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an }

{ cf, −bu, bj, −bl, bw, −ch, −cd, bs, −bh, bn, −by, cj, cb, −bp, ca, ck, −bz, bo, −bg, br, −cc, −ci, bx, −bm, bi, −bt, ce, cg, −by, bk, −bk, by, −cg, −ce, bt, −bi, bm, −bx, ci, cc, −br, bg, −bo, bz, −ck, −ca, bp, −bf, bq, −cb, −cj, by, −bn, bh, −bs, cd, ch, −bw, bl, −bj, bu, −cf }

{ bc, −ax, as, −aq, ay, −ba, −be, az, −au, ap, −at, ay, −bd, −bb, aw, −ar, ar, −aw, bb, bd, −ay, at, −ap, au, −az, be, ba, −ay, aq, −as, ax, −bc, −bc, ax, −as, aq, −ay, ba, be, −az, au, −ap, at, −ay, bd, bb, −aw, ar, −ar, aw, −bb, −bd, ay, −at, ap, −au, az, −be, −ba, ay, −aq, as, −ax, bc }

{ cg, −bx, bo, −bf, bn, −bw, cf, ch, −by, bp, −bg, bm, −by, ce, ci, −bz, bq, −bh, bl, −bu, cd, cj, −ca, br, −bi, bk, −bt, cc, ck, −cb, bs, −bj, bj, −bs, cb, −ck, −cc, bt, −bk, bi, −br, ca, −cj, −cd, bu, −bl, bh, −bq, bz, −ci, −ce, by, −bm, bg, −bp, by, −ch, −cf, bw, −bn, bf, −bo, bx, −cg }

{ ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag }

{ ch, −ca, bt, −bm, bf, −bl, bs, −bz, cg, ci, −cb, bu, −bn, bg, −bk, br, −by, cf, cj, −cc, by, −bo, bh, −bj, bq, −bx, ce, ck, −cd, bw, −bp, bi, −bi, bp, −bw, cd, −ck, −ce, bx, −bq, bj, −bh, bo, −by, cc, −cj, −cf, by, −br, bk, −bg, bn, −bu, cb, −ci, −cg, bz, −bs, bl, −bf, bm, −bt, ca, −ch }

{ bd, −ba, ax, −au, ar, −ap, as, −ay, ay, −bb, be, be, −az, aw, −at, aq, −aq, at, −aw, az, −bc, −be, bb, −ay, ay, −as, ap, −ar, au, −ax, ba, −bd, −bd, ba, −ax, au, −ar, ap, −as, ay, −ay, bb, −be, −bc, az, −aw, at, −aq, aq, −at, aw, −az, bc, be, −bb, ay, −ay, as, −ap, ar, −au, ax, −ba, bd }

{ ci, −cd, by, −bt, bo, −bj, bf, −bk, bp, −bu, bz, −ce, cj, ch, −cc, bx, −bs, bn, −bi, bg, −bl, bq, −by, ca, −cf, ck, cg, −cb, bw, −br, bm, −bh, bh, −bm, br, −bw, cb, −cg, −ck, cf, −ca, by, −bq, bl, −bg, bi, −bn, bs, −bx, cc, −ch, −cj, ce, −bz, bu, −bp, bk, −bf, bj, −bo, bt, −by, cd, −ci }

{ ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao, ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao }

{ cj, −cg, cd, −ca, bx, −bu, br, −bo, bl, −bi, bf, −bh, bk, −bn, bq, −bt, bw, −bz, cc, −cf, ci, ck, −ch, ce, −cb, by, −bv, bs, −bp, bm, −bj, bg, −bg, bj, −bm, bp, −bs, by, −by, cb, −ce, ch, −ck, −ci, cf, −cc, bz, −bw, bt, −bq, bn, −bk, bh, −bf, bi, −bl, bo, −br, bu, −bx, ca, −cd, cg, −cj }

{ be, −bd, bc, −bb, ba, −az, ay, −ax, aw, −ay, au, −at, as, −ar, aq, −ap, ap, −aq, ar, −as, at, −au, ay, −aw, ax, −ay, az, −ba, bb, −bc, bd, −be, −be, bd, −bc, bb, −ba, az, −ay, ax, −aw, ay, −au, at, −as, ar, −aq, ap, −ap, aq, −ar, as, −at, au, −ay, aw, −ax, ay, −az, ba, −bb, bc, −bd, be }

{ ck, −cj, cl, −ch, cg, −cf, ce, −cd, cc, −cb, ca, −bz, by, −bx, bw, −bu, −bt, bs, −br, bq, −bp, bo, −bn, bm, −bl, bk, −bj, bi, −bh, bg, −bf, bf, −bg, bh, −bi, bj, −bk, bl, −bm, bn, −bo, bp, −bq, br, −bs, bt, −bu, by, −bw, bx, −by, bz, −ca, cb, −cc, cd, −se, cf, −cg, ch, −ci, cj, −ck }

}
where
{ aa, ab, ac, ad, ae, af, ag, ah, ai, aj, ak, al, am, an, ao, ap, aq, ar, as, at, au, ay, aw, ax, ay, az, ba, bb, bc, bd, be, bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck} =
{64, 83, 36, 89, 75, 50, 18, 90, 87, 80, 70, 57, 43, 25, 9, 90, 90, 88, 85, 82, 78, 73, 67, 61, 54, 46, 38, 31, 22, 13, 4, 91, 90, 90, 90, 88, 87, 86, 84, 83, 81, 79, 77, 73, 71, 69, 65, 62, 59, 56, 52, 48, 44, 41, 37, 33, 28, 24, 20, 15, 11, 7, 2}

APPENDIX III 4-point DST-7
{ a, b, c, d }
{ c, c, 0, −c }
{ d, −a, −c, b }
{ b, −d, c, −a }
where {a, b, c, d} = {29, 55, 74, 84}
8-point DST-7:
{ a, b, c, d, e, f, g, h, }
{ c, f, h, e, b, −a, −d, −g,}

APPENDIX III-continued

{ e, g, b, -c, -h, -d, a, f,}
{ g, c, -d, -f, a, h, b, -e,}
{ h, -a, -g, b, f, -c, -e, d,}
{ f, -e, -a, g, -d, -b, h, -c,}
{ d, -h, e, -a, -c, g, -f, b,}
{ b, -d, f, -h, g, -e, c, -a,}
where {a, b, c, d, e, f, g, h} = {17, 32, 46, 60, 71, 78, 85, 86}

16-point DST-7
{ a, b, c, d, e, f, g, h, i, j, k, l, m, n, o, p,}
{ c, f, i, l, o, o, l, i, f, c, 0, -c, -f, -i, -l, -o,}
{ e, j, o, m, h, c, -b, -g, -l, -p, -k, -f, -a, d, i, n,}
{ g, n, l, e, -b, -i, -p, -j, -c, d, k, o, h, a, -f, -m,}
{ i, o, f, -c, -l, -l, -c, f, o, i, 0, -i, -o, -f, c, l,}
{ k, k, 0, -k, -k, 0, k, k, 0, -k, -k, 0, k, k, 0, -k,}
{ m, g, -f, -n, -a, l, h, -e, -o, -b, k, i, -d, -p, -c, j,}
{ o, c, -l, -f, i, i, -f, -l, c, o, 0, -o, -c, l, f, -i,}
{ p, -a, -o, b, n, -c, -m, d, l, -e, -k, f, j, -g, -i, h,}
{ n, -e, -i, j, d, -o, a, m, -f, -h, k, c, -p, b, l, -g,}
{ l, -i, -c, o, -f, -f, o, -c, -i, l, 0, -l, i, c, -o, f,}
{ j, -m, c, g, -p, f, d, -n, i, a, -k, l, -b, -h, o, -e,}
{ h, -p, i, -a, -g, o, -j, b, f, -n, k, -c, -e, m, -l, d,}
{ f, -l, o, -i, c, c, -i, o, -l, f, 0, -f, l, -o, i, -c,}
{ d, -h, l, -p, m, -i, e, -a, -c, g, -k, o, -n, j, -f, b,}
{ b, -d, f, -h, j, -l, n, -p, o, -m, k, -i, g, -e, c, -a,}
where {a, b, c, d, e, f, g, h, i, j, k, l, m, n, o, p} = {9, 17, 25, 33, 41, 49, 56, 62, 66, 72, 77, 81, 83, 87, 89, 90}

32-point DST-7
{ a, b, c, d, e, f, g, h, i, j, k, l, m, n, o, p, q, r, s, t, u, v, w, x, y, z, A, B, C, D, E, F,}
{ c, f, i, l, o, r, u, x, A, D, F, C, z, w, t, q, n, k, h, e, b, -a, -d, -g, -j, -m, -p, -s, -v, -y, -B, -E,}
{ e, j, o, t, y, D, D, y, t, o, j, e, o, -e, -j, -o, -t, -y, -D, -D, -y, -t, -o, -j, -e, 0, e, j, o, t, y, D,}
{ g, n, u, B, D, w, p, i, b, -e, -l, -s, -z, -F, -y, -r, -k, -d, c, j, q, x, E, A, t, m, f, -a, -h, -o, -v, -C,}
{ i, r, A, C, t, k, b, -g, -p, -y, -E, -v, -m, -d, e, n, w, F, x, o, f, -c, -l, -u, -D, -z, -q, -h, a, j, s, B,}
{ k, v, F, u, j, -a, -l, -w, -E, -t, -i, b, m, x, D, s, h, -c, -n, -y, -C, -r, -g, d, o, z, B, q, f, -e, -p, -A,}
{ m, z, z, m, 0, -m, -z, -z, -m, 0, m, z, z, m, 0, -m, -z, -z, -m, 0, m, z, z, m, 0, -m, -z, -z, -m, 0, m, z,}
{ o, D, t, e, -j, -y, -y, -j, e, t, D, o, 0, -o, -D, -t, -e, j, y, y, j, -e, -t, -D, -o, 0, o, D, t, e, -j, -y,}
{ q, E, n, -c, -t, -B, -k, f, w, y, h, -i, -z, -v, -e, l, C, s, b, -o, -F, -p, a, r, D, m, -d, -u, -A, -j, g, x,}
{ s, A, h, -k, -D, -p, c, v, x, e, -n, -F, -m, f, y, u, b, -q, -C, -j, i, B, r, -a, -t, -z, -g, l, E, o, -d, -w,}
{ u, w, b, -s, -y, -d, q, A, f, -o, -C, -h, m, E, j, -k, -F, -l, i, D, n, -g, -B, -p, e, z, r, -c, -x, -t, a, v,}
{ w, s, -d, -A, -o, h, E, k, -l, -D, -g, p, z, c, -t, -v, a, x, r, -e, -B, -n, i, F, j, -m, -C, -f, q, y, b, -u,}
{ y, o, -j, -D, -e, t, t, -e, -D, -j, o, y, 0, -y, -o, j, D, e, -t, -t, e, D, j, -o, -y, 0, y, o, -j, -D, -e, t,}
{ A, k, -p, -v, e, F, f, -u, -q, j, B, a, -z, -l, o, w, -d, -E, -g, t, r, -i, -C, -b, y, m, -n, -x, c, D, h, -s,}
{ C, g, -v, -n, o, u, -h, -B, a, D, f, -w, -m, p, t, -i, -A, b, E, e, -x, -l, q, s, -j, -z, c, F, d, -y, -k, r,}
{ E, c, -B, -f, y, i, -v, -l, s, o, -p, -r, m, u, -j, -x, g, A, -d, -D, a, F, b, -C, -e, z, h, -w, -k, t, n, -q,}
{ F, -a, -E, b, D, -c, -C, d, B, -e, -A, f, z, -g, -y, h, x, -i, -w, j, v, -k, -u, l, t, -m, -s, n, r, -o, -q, p,}
{ D, -e, -y, j, t, -o, -o, t, j, -y, -e, D, 0, -D, e, y, -j, -t, o, o, -t, -j, y, e, -D, 0, D, -e, -y, j, t, -o,}
{ B, -i, -s, r, j, -A, -a, C, -h, -t, q, k, -z, -b, D, -g, -u, p, l, -y, -c, E, -f, -v, o, m, -x, -d, F, -e, -w, n,}
{ z, -m, -m, z, 0, -z, m, m, -z, 0, z, -m, -m, z, 0, -z, m, m, -z, 0, z, -m, -m, z, 0, -z, m, m, -z, 0, z, -m,}
{ x, -q, -g, E, -j, -n, A, -c, -u, t, d, -B, m, k, -D, f, r, -w, -a, y, -p, -h, F, -i, -o, z, -b, -v, s, e, -C, l,}
{ v, -u, -a, w, -t, -b, x, -s, -c, y, -r, -d, z, -q, -e, A, -p, -f, B, -o, -g, C, -n, -h, D, -m, -i, E, -l, -j, F, -k,}
{ t, -y, e, o, -D, j, j, -D, o, e, -y, t, 0, -t, y, -e, -o, D, -j, -j, D, -o, -e, y, -t, 0, t, -y, e, o, -D, j,}
{ r, -C, k, g, -y, v, -d, -n, F, -o, -c, u, -z, h, j, -B, s, -a, -q, D, -l, -f, x, -w, e, m, -E, p, b, -t, A, -i,}
{ p, -F, q, -a, -o, E, -r, b, n, -D, s, -c, -m, C, -t, d, l, -B, u, -e, -k, A, -v, f, j, -z, w, -g, -i, y, -x, h,}
{ n, -B, w, -i, -e, s, -F, r, -d, -j, x, -A, m, a, -o, C, -v, h, f, -t, E, -q, c, k, -y, z, -l, -b, p, -D, u, -g,}

APPENDIX III-continued

{ l, −x, C, −q, e, g, −s, E, −v, j, b, −n, z, −A, o, −c, −i, u, −F, t, −h, −d, p, −B, y, −m, a, k, −w, D, −r, f,}
{ j, −t, D, −y, o, −e, −e, o, −y, D, −t, j, 0, −j, t, −D, y, −o, e, e, −o, y, −D, t, −j, 0, j, −t, D, −y, o, −e, }
{ h, −p, x, −F, y, −q, i, −a, −g, o, −w, E, −z, r, −j, b, f, −n, v, −D, A, −s, k, −c, −e, m, −u, C, −B, t, −l, d,}
{ f, −l, r, −x, D, −C, w, −q, k, −e, −a, g, −m, s, −y, E, −B, v, −p, j, −d, −b, h, −n, t, −z, F, −A, u, −o, i, −c,}
{ d, −h, l, −p, t, −x, B, −F, C, −y, u, −q, m, −i, e, −a, −c, g, −k, o, −s, w, −A, E, −D, z, −v, r, −n, j, −f, b,}
{ b, −d, f, −h, j, −l, n, −p, r, −t, v, −x, z, −B, D, −F, E, −C, A, −y, w, −u, s, −q, o, −m, k, −i, g, −e, c, −a,}
where {a, b, c, d, e, f, g, h, i, j, k, l, m, n, o, p, q, r, s, t, u, v, w, x, y, z, A, B, C, D, E, F } = {4, 9, 13, 17, 21, 26, 30, 34, 38, 42, 45, 50, 53, 56, 60, 63, 66, 68, 72, 74, 77, 78, 80, 82, 84, 85, 86, 88, 88, 89, 90, 90 }

4-point DCT-8
{ a, b, c, d,}
{ b, 0, −b, −b,}
{ c, −b, −d, a,}
{ d, −b, a, −c,}
where {a, b, c, d} = { 84, 74, 55, 29}

8-point DCT-8:
{ a, b, c, d, e, f, g, h,}
{ b, e, h, −g, −d, −a, −c, f}
{ c, h, −e, −a, −f, g, b, d,}
{ d, −g, −a, −h, c, e, −f, −b,}
{ e, −d, −f, c, g, −b, −h, a,}
{ f, −a, g, e, −b, h, d, −c,}
{ g, −c, b, −f, −h, d, −a, e,}
{ h, −f, d, −b, a, −c, e, −g,}
where {a, b, c, d, e, f, g, h} = { 86, 85, 78, 71, 60, 46, 32, 17}

16-point DCT-8
{ a, b, c, d, e, f, g, h, i, j, k, l, m, n, o, p,}
{ b, e, h, k, n, 0, −n, −k, −h, −e, −b, −b, −e, −h, −k, −n,}
{ c, h, m, −p, −k, −f, −a, −e, −j, −o, n, i, d, b, g, l,}
{ d, k, −p, −i, −b, −f, −m, n, g, a, h, o, −l, −e, −c, −j,}
{ e, n, −k, −b, −h, 0, h, b, k, −n, −e, −e, −n, k, b, h,}
{ f, 0, −f, −f, 0, f, f, 0, −f, −f, 0, f, f, 0, −f, −f,}
{ g, −n, −a, −m, h, f, −o, −b, −l, i, e, −p, −c, −k, j, d,}
{ h, −k, −e, n, b, 0, −b, −n, e, k, −h, −h, k, e, −n, −b,}
{ i, −h, −j, g, k, −f, −l, e, m, −d, −n, c, o, −b, −p, a,}
{ j, −e, −o, a, −n, −f, i, k, −d, −p, b, −m, −g, h, l, −c,}
{ k, −b, n, h, −e, 0, e, −h, −n, b, −k, −k, b, −n, −h, e,}
{ l, −b, i, o, −e, f, −p, −h, c, −m, −k, a, −j, −n, d, −g,}
{ m, −e, d, −l, −n, f, −c, k, o, −g, b, −j, −p, h, −a, i,}
{ n, −h, b, −e, k, 0, −k, e, −b, h, −n, −n, h, −b, e, −k,}
{ o, −k, g, −c, b, −f, j, −n, −p, l, −h, d, −a, e, −i, m,}
{ p, −n, l, −j, h, −f, d, −b, a, −c, e, −g, i, −k, m, −o,}
where {a, b, c, d, e, f, g, h, i, j, k, l, m, n, o, p} = { 90, 89, 87, 83, 81, 77, 72, 66, 62, 56, 49, 41, 33, 25, 17, 9}

32-point DCT-8
{ a, b, c, d, e, f, g, h, i, j, k, l, m, n, o, p, q, r, s, t, u, v, w, x, y, z, A, B, C, D, E, F,}
{ b, e, h, k, n, q, t, w, z, C, F, −E, −B, −y, −v, −s, −p, −m, −j, −g, −d, −a, −c, −f, −i, −l, −o, −r, −u, −x, −A, −D,}
{ c, h, m, r, w, B, 0, −B, −w, −r, −m, −h, −c, −c, −h, −m, −r, −w, −B, 0, B, w, r, m, h, c, c, h, m, r, w, B,}
{ d, k, r, y, F, −A, −t, −m, −f, −b, −i, −p, −w, −D, C, v, o, h, a, g, n, u, B, −E, −x, −q, −j, −c, −e, −l, −s, −z,}
{ e, n, w, F, −y, −p, −g, −c, −l, −u, −D, A, r, i, a, j, s, B, −C, −t, −k, −b, −h, −q, −z, E, v, m, d, f, o, x,}
{ f, q, B, −A, −p, −e, −g, −r, −C, z, o, d, h, s, D, −y, −n, −c, −i, −t, −E, x, m, b, j, u, F, −w, −l, −a, −k, −v,}
{ g, t, 0, −t, −g, −g, −t, 0, t, g, g, t, 0, −t, −g, −g, −t, 0, t, g, g, t, 0, −t, −g, −g, −t, 0, t, g, g, t,}
{ h, w, −B, −m, −c, −r, 0, r, c, m, B, −w, −h, −h, −w, B, m, c, r, 0, −r, −C, −m, −B, w, h, h, w, −B, −m, −c, −r,}
{ i, z, −w, −f, −l, −C, t, c, o, F, −q, −a, −r, E, n, d, u, −B, −k, −g, −x, y, h, j, A, −v, −e, −m, −D, s, b, p,}
{ j, C, −r, −b, −u, z, g, m, F, −o, −e, −x, w, d, p, −E, −l, −h, −A, t, a, s, −B, −i, −k, −D, q, c, v, −y, −f, −n,}
{ k, F, −m, −i, −D, o, g, B, −q, −e, −z, s, c, x, −u, −a, −v, w, b, t, −y, −d, −r, A, f, p, −C, −h, −n, E, j, l,}
{ l, −E, −h, −p, A, d, t, −w, −a, −x, s, e, B, −o, −i, −F, k, m, −D, −g, −q, z, c, u, −v, −b, −y, r, f, C, −n, −j,}
{ m, −B, −c, −w, r, h, 0, −h, −r, w, c, B, −m, −m, B, c, w, −r, −h, 0, h, r, −w, −c, −B, m, m, −B, −c, −w, r, h,}
{ n, −y, −c, −D, i, s, −t, −h, E, d, x, −o, −m, z, b, C, −j, −r, u, g, −F, −e, −w, p, l, −A, −a, −B, k, q, −v, −f,}
{ o, −v, −h, C, a, D, −g, −w, n, p, −u, −i, B, b, E, −f, −x, m, q, −t, −j, A, c, F, −e, −y, l, r, −s, −k, z, d,}

APPENDIX III-continued

{ p, −s, −m, v, j, −y, −g, B, d, −E, −a, −F, c, C, −f, −z, i, w, −l, −t, o, q, −r, −n, u, k, −x, −h, A, e, −D, −b,}
{ q, −p, −r, o, s, −n, −t, m, u, −l, −v, k, w, −j, −x, i, y, −h, −z, g, A, −f, −B, e, C, −d, −D, c, E, −b, −F, a,}
{ r, −m, −w, h, B, −c, 0, c, −B, −h, w, m, −r, −r, m, w, −h, −B, c, 0, −c, B, h, −w, −m, r, r, −m, −w, h, B, −c, }
{ s, −j, −B, a, −C, −i, t, r, −k, −A, b, −D, −h, u, q, −l, −z, c, −E, −g, v, p, −m, −y, d, −F, −f, w, o, −n, −x, e,}
{ t, −g, 0, g, −t, −t, g, 0, −g, t, t, −g, 0, g, −t, −t, g, 0, −g, t, t, −g, 0, g, −t, −t, g, 0, −g, t, t, −g,}
{ u, −d, B, n, −k, −E, g, −r, −x, a, −y, −q, h, −F, −j, o, A, −c, v, t, −e, C, m, −l, −D, f, −s, −w, b, −z, −p, i,}
{ v, −a, w, u, −b, x, t, −c, y, s, −d, z, r, −e, A, q, −f, B, p, −g, C, o, −h, D, n, −i, E, m, −j, F, l, −k,}
{ w, −c, r, B, −h, m, 0, −m, h, −B, −r, c, −w, −w, c, −r, −B, h, −m, 0, m, −h, B, r, −c, w, w, −c, r, B, −h, m,}
{ x, −f, m, −E, −q, b, −t, −B, j, −i, A, u, −c, p, F, −n, e, −w, −y, g, −l, D, r, −a, s, C, −k, h, −z, −v, d, −o,}
{ y, −i, h, −x, −z, j, −g, w, A, −k, f, −v, −B, l, −e, u, C, −m, d, −t, −D, n, −c, s, E, −o, b, −r, −F, p, −a, q,}
{ z, −l, c, −q, E, u, −g, h, −v, −D, p, −b, m, −A, −y, k, −d, r, −F, −t, f, −i, w, C, −o, a, −n, B, x, −j, e, −s,}
{ A, −o, c, −j, v, F, −t, h, −e, q, −C, −y, m, −a, l, −x, −D, r, −f, g, −s, E, w, −k, b, −n, z, B, −p, d, −i, u,}
{ B, −r, h, −c, m, −w, 0, w, −m, c, −h, r, −B, −B, r, −h, c, −m, w, 0, −w, m, −c, h, −r, B, B, −r, h, −c, m, −w,}
{ C, −u, m, −e, d, −l, t, −B, −D, v, −n, f, −c, k, −s, A, E, −w, o, −g, b, −j, r, −z, −F, x, −p, h, −a, i, −q, y,}
{ D, −x, r, −l, f, −a, g, −m, s, −y, E, C, −w, q, −k, e, −b, h, −n, t, −z, F, B, −v, p, −j, d, −c, i, −o, u, −A,}
{ E, −A, w, −s, o, −k, g, −c, b, −f, j, −n, r, −v, z, −D, −F, B, −x, t, −p, l, −h, d, −a, e, −i, m, −q, u, −y, C,}
{ F, −D, B, −z, x, −v, t, −r, p, −n, l, −j, h, −f, d, −b, a, −c, e, −g, i, −k, m, −o, q, −s, u, −w, y, −A, C, −E,}
where {a, b, c, d, e, f, g, h, i, j, k, l, m, n, o, p, q, r, s, t, u, v, w, x, y, z, A, B, C, D, E, F } = {90, 90, 89, 88, 88, 86, 85, 84, 82, 80, 78, 77, 74, 72, 68, 66, 63, 60, 56, 53, 50, 45, 42, 38, 34, 30, 26, 21, 17, 13, 9, 4}

What is claimed is:

1. A method for video decoding in a decoder, comprising:
decoding coded information of a transform block (TB) from a coded video bitstream, the coded information indicating a region of the TB on which a secondary transform is applied, the region including a first sub-region having transform coefficients calculated by the secondary transform and a second sub-region that is a zero-out region;
in response to a determination that a neighboring transform coefficient is in the second sub-region and a current transform coefficient in the TB is not in the second sub-region, determining the current transform coefficient according to a default value for the neighboring transform coefficient; and
reconstructing a sample in the TB based on the current transform coefficient for the sample.

2. The method of claim 1, wherein
the current transform coefficient in the TB is one of a plurality of transform coefficients in a first coefficient group (CG), a first CG flag for the first CG indicating whether at least one of the plurality of transform coefficients in the first CG is a non-zero transform coefficient;
a second CG including transform coefficients is previously entropy decoded and is a neighbor of the first CG; and
the method further includes:
determining a location of the second CG; and
when the second CG is determined to be located in the second sub-region, determining the first CG flag based on a default value for a second CG flag for the second CG.

3. The method of claim 1, wherein
the current transform coefficient in the TB is one of a plurality of transform coefficients in a first coefficient group (CG), a first CG flag for the first CG indicating whether at least one of the plurality of transform coefficients in the first CG is a non-zero transform coefficient;
a second CG includes a first transform coefficient and a second transform coefficient, the second CG being previously entropy decoded and a neighbor of the first CG; and
the method further includes:
determining a location of the second CG; and
when a portion of the second CG including the second transform coefficient is located in the second sub-region and the first transform coefficient is a non-zero transform coefficient, determining the first CG flag based on a second CG flag for the second CG.

4. The method of claim 1, further comprising:
based on the current transform coefficient being in the second sub-region, determining that the current transform coefficient is not signaled and is zero.

5. The method of claim 1, wherein the determining the current transform coefficient comprises:
determining a syntax element of the current transform coefficient, the syntax element indicating one of: whether the current transform coefficient is a non-zero transform coefficient; a parity of the current transform coefficient; whether the current transform coefficient is larger than 2; and whether the current transform coefficient is larger than 4.

6. A method for video decoding in a decoder, comprising:
decoding coded information of a transform block (TB) from a coded video bitstream; and in response to the coded information indicating that a secondary transform is to be performed on a first region of the TB,
performing the secondary transform on the first region of the TB, the first region including a first sub-region having transform coefficients calculated by the secondary transform and a second sub-region, transform coefficients of the second sub-region being set to zero; and
determining that transform coefficients in a second region in the TB are zero, the second region being outside the first region.

7. The method of claim 6, wherein a size and a location of a coefficient unit that includes multiple transform coefficients in the TB are determined based on the first region, and transform coefficients outside the coefficient unit are zero.

8. The method of claim 7, wherein the first region is a top-left 8×8 region in the TB, the coefficient unit is the first region, and the second region is adjacent to the top-left 8×8 region.

9. The method of claim 7, wherein the first sub-region is a top-left 4×4 region in the TB, the coefficient unit is the first sub-region in the first region, and transform coefficients in a combined region including the second region and the second sub-region are zero.

10. The method of claim 7, wherein the first region is a top-left 4×4 region in the TB, the coefficient unit is the first region, and the second region is adjacent to the top-left 4×4 region.

11. An apparatus for video decoding, comprising processing circuitry configured to:
decode coded information of a transform block (TB) from a coded video bitstream, the coded information indicating a region of the TB on which a secondary transform is applied, the region including a first sub-region having transform coefficients calculated by the secondary transform and a second sub-region that is a zero-out region;
in response to a determination that a neighboring transform coefficient is in the second sub-region and a current transform coefficient in the TB is not in the second sub-region, determine the current transform coefficient according to a default value for the neighboring transform coefficient; and
reconstruct a sample in the TB based on the current transform coefficient for the sample.

12. The apparatus of claim 11, wherein
the current transform coefficient in the TB is one of a plurality of transform coefficients in a first coefficient group (CG), a first CG flag for the first CG indicating whether at least one of the plurality of transform coefficients in the first CG is a non-zero transform coefficient;
a second CG including transform coefficients is previously entropy decoded and is a neighbor of the first CG; and the processing circuitry is further configured to:
determine a location of the second CG; and
when the second CG is determined to be located in the second sub-region, determine the first CG flag based on a default value for a second CG flag for the second CG.

13. The apparatus of claim 11, wherein
the current transform coefficient in the TB is one of a plurality of transform coefficients in a first coefficient group (CG), a first CG flag for the first CG indicating whether at least one of the plurality of transform coefficients in the first CG is a non-zero transform coefficient;
a second CG includes a first transform coefficient and a second transform coefficient, the second CG being previously entropy decoded and a neighbor of the first CG; and
the processing circuitry is further configured to:
determine a location of the second CG; and
when a portion of the second CG including the second transform coefficient is located in the second sub-region and the first transform coefficient is a non-zero transform coefficient, determine the first CG flag based on a second CG flag for the second CG.

14. The apparatus of claim 11, wherein the processing circuitry is further configured to:
based on the current transform coefficient being in the second sub-region, determine that the current transform coefficient is not signaled and is zero.

15. The apparatus of claim 11, wherein the processing circuitry is further configured to:
determine a syntax element of the current transform coefficient, the syntax element indicating one of: whether the current transform coefficient is a non-zero transform coefficient; a parity of the current transform coefficient; whether the current transform coefficient is larger than 2; or whether the current transform coefficient is larger than 4.

16. The apparatus of claim 11, wherein the processing circuitry is further configured to:
determine that transform coefficients of a second region in the TB are zero, the second region being outside the region on which the secondary transform is applied.

17. The apparatus of claim 16, wherein a size and a location of a coefficient unit that includes multiple transform coefficients in the TB are determined based on the region and transform coefficients outside the coefficient unit are zero.

18. The apparatus of claim 17, wherein the region is a top-left 8×8 region in the TB, the coefficient unit is the region, and the second region is adjacent to the top-left 8×8 region.

19. The apparatus of claim 17, wherein the first sub-region is a top-left 4×4 region in the TB, the coefficient unit is the first sub-region in the region, and transform coefficients in a combined region including the second region and the second sub-region are zero.

20. The apparatus of claim 17, wherein the region is a top-left 4×4 region in the TB, the coefficient unit is the region, and the second region is adjacent to the top-left 4×4 region.

* * * * *